United States Patent
De Vegt et al.

(10) Patent No.: US 11,770,703 B2
(45) Date of Patent: Sep. 26, 2023

(54) PASSIVE DIGITAL KEY SYSTEMS

(71) Applicant: QUALCOMM Incorporated, San Diego, CA (US)

(72) Inventors: Rolf De Vegt, San Francisco, CA (US); Xiaoxin Zhang, Sunnyvale, CA (US); Peyman Siyari, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/223,880

(22) Filed: Apr. 6, 2021

(65) Prior Publication Data

US 2022/0322085 A1    Oct. 6, 2022

(51) Int. Cl.
| | | |
|---|---|---|
| *H04W 12/06* | (2021.01) | |
| *H04W 12/63* | (2021.01) | |
| *H04W 12/122* | (2021.01) | |
| *H04W 4/02* | (2018.01) | |

(52) U.S. Cl.
CPC ........... *H04W 12/06* (2013.01); *H04W 4/023* (2013.01); *H04W 12/122* (2021.01); *H04W 12/63* (2021.01)

(58) Field of Classification Search
CPC ... H04W 12/06; H04W 12/08; H04W 12/104; H04W 12/122; H04W 12/63; H04W 4/023; H04W 4/40; H04W 4/80; H04L 63/107; H04L 63/123; H04L 63/1466; H04L 67/12; G01S 5/0258; G01S 5/0284; G01S 13/765; G01S 2205/01; G07C 9/00309; G07C 2009/00555; G07C 2209/63; B60R 25/24
See application file for complete search history.

(56) References Cited

U.S. PATENT DOCUMENTS

| | | | | |
|---|---|---|---|---|
| 10,542,518 | B2* | 1/2020 | Bitra | H04W 64/003 |
| 2013/0029685 | A1* | 1/2013 | Moshfeghi | H04B 5/0043 |
| | | | | 455/456.1 |
| 2015/0208207 | A1* | 7/2015 | Ye | H04W 4/023 |
| | | | | 455/456.1 |
| 2016/0335897 | A1* | 11/2016 | Naserian | H04W 4/46 |
| 2018/0234797 | A1 | 8/2018 | Edvina et al. | |
| 2019/0069262 | A1* | 2/2019 | Harney | G01C 21/3664 |
| 2019/0320403 | A1* | 10/2019 | Zhang | H04W 64/003 |
| 2022/0118994 | A1* | 4/2022 | Lu | G06T 7/85 |

FOREIGN PATENT DOCUMENTS

WO    2018112224 A1    6/2018

OTHER PUBLICATIONS

International Search Report and Written Opinion—PCT/US2022/013866—ISA/EPO—dated May 6, 2022.

* cited by examiner

*Primary Examiner* — Mohammad W Reza
(74) *Attorney, Agent, or Firm* — Thien T. Nguyen

(57) ABSTRACT

Techniques are provided for validating a mobile device in a passive digital key system. An example method of validating a mobile device includes determining a positioning measurement for the mobile device relative to a reference point, obtaining a measured distance with at least a first transceiver, obtaining a calibration distance based at least in part on the positioning measurement for the mobile device, computing a validation distance based at least in part on a difference between the measured distance and the calibration distance, and validating the mobile device based at least in part on a comparison of the validation distance and a threshold value.

50 Claims, 16 Drawing Sheets

PASSIVE DIGITAL KEY SYSTEMS

BACKGROUND

The use of wireless devices for many everyday activities is becoming common. Modern wireless devices may make use of one or more wireless communication technologies. For example, a wireless device may communicate using a short range communication technology such as Bluetooth technology, UWB technology, mmWave technology, etc. The use of short range communication technologies, such as Bluetooth, in wireless devices has become much more common in the last several years and is regularly used in retail businesses, offices, homes, cars, and public gathering places. As the use of short-range communications has grown, so has the need of securing short-range communications between wireless devices from third party attacks. For example, Bluetooth communications between wireless devices are susceptible to certain third party attacks such as the relay in the middle (RITM) attack. A RITM attack is an attack that occurs when a third party attacker intercepts packets transmitted between Bluetooth wireless devices and then subsequently relays those packets to one of the wireless devices in order to gain access. One example includes a third party attacker relaying packets from a key fob to an automobile in order to unlock the automobile car door. A RITM attack can create significant risk to important data and physical property since a successful RITM attacker can gain access in a fairly undetectable manner. The existing solutions to a RITM attack have certain limitations that may not adequately protect users of wireless devices.

SUMMARY

An example method of validating a mobile device according to the disclosure includes determining a positioning measurement for the mobile device relative to a reference point, obtaining a measured distance with at least a first transceiver, obtaining a calibration distance based at least in part on the positioning measurement for the mobile device, computing a validation distance based at least in part on a difference between the measured distance and the calibration distance, and validating the mobile device based at least in part on a comparison of the validation distance and a threshold value.

Implementations of such a method may include of one or more of the following features. The reference point and the first transceiver may be within a vehicle. The reference point and the first transceiver may be within a fixed structure. The positioning measurement may indicate an angle to the mobile device. Determining the angle to the mobile device may include determining an angle of arrival of a signal transmitted by the mobile device. The signal transmitted by the mobile device may be received by the first transceiver. Determining the angle to the mobile device may include determining the mobile device is proximate to a second transceiver, such that the second transceiver is disposed in a known location relative to the reference point. The method may include determining a received signal strength of one or more signals transmitted by the mobile device and received by the second transceiver. The second transceiver may be configured to utilize a smaller bandwidth than the first transceiver. Obtaining the calibration distance may include querying a data structure based on the angle. Obtaining the measured distance to the mobile device may include determining a time of flight for signals transmitted between the mobile device and the first transceiver. The positioning measurement may indicate a distance to the mobile device measured by at least one second transceiver. The distance to the mobile device may be based on at least one of a received signal strength indication measurement, or a time of flight measurement. Obtaining the calibration distance may include querying a data structure based on an identification value associated with the at least one second transceiver. The method may include determining a context associated with the mobile device, and determining the threshold value based on the context.

An example method of validating a mobile device according to the disclosure includes determining an angle to the mobile device relative to a reference point with at least a first radio transceiver, obtaining a measured distance to the mobile device with at least a second radio transceiver, obtaining a calibration distance based at least in part on the angle to the mobile device, computing a validation distance based at least in part on a difference between the measured distance and the calibration distance, and validating the mobile device based at least in part on a comparison of the validation distance and a threshold value.

Implementations of such a method may include one or more of the following features. Determining the angle to the mobile device may include determining the mobile device is located within a predefined angular segment. The second radio transceiver may be configured to utilize a wider bandwidth than the first radio transceiver. Obtaining the calibration distance may include obtaining the calibration distance from a data structure based at least in part on the angle to the mobile device. The first radio transceiver and the second radio transceiver may be disposed in a vehicle, and the calibration distance may be based on a distance between the second radio transceiver and a perimeter of the vehicle. The first radio transceiver and the second radio transceiver may be disposed in a vehicle, and the calibration distance may be based on a distance between the reference point and a perimeter of the vehicle. The first radio transceiver and the second radio transceiver may be disposed in a vehicle, and the threshold value may be based on a context of the vehicle. The first radio transceiver may be proximate to an entrance to a fixed structure, and the second radio transceiver may be a radio access point within the fixed structure. Obtaining the measured distance may include determining a round trip time between the second radio transceiver and the mobile device.

An example apparatus according to the disclosure includes a memory, at least one transceiver, at least one processor communicatively coupled to the memory and the at least one transceiver, and configured to determine a positioning measurement for a mobile device relative to a reference point, obtain a measured distance with at least a first transceiver, obtain a calibration distance based at least in part on the positioning measurement for the mobile device, compute a validation distance based at least in part on a difference between the measured distance and the calibration distance, and validate the mobile device based at least in part on a comparison of the validation distance and a threshold value.

Implementations of such an apparatus may include one or more of the following features. The reference point and the first transceiver may be within a vehicle. The reference point and the first transceiver may be within a fixed structure. The positioning measurement may indicate an angle to the mobile device. The at least one processor may be further configured to determine an angle of arrival of a signal transmitted by the mobile device. The signal transmitted by the mobile device may be received by the first transceiver.

A second transceiver may be disposed in a known location relative to the reference point, such that the at least one processor may be further configured to determine the mobile device is proximate to the second transceiver. The at least one processor may be further configured to determine a received signal strength of one or more signals transmitted by the mobile device and received by the second transceiver. The second transceiver may be configured to utilize a smaller bandwidth than the first transceiver. The at least one processor may be further configured to query a data structure stored in the memory based on the angle. The at least one processor may be further configured to determine a time of flight for signals transmitted between the mobile device and the first transceiver. The positioning measurement may indicate a distance to the mobile device measured by at least one second transceiver. The at least one processor may be further configured to compute the distance to the mobile device based on at least one of a received signal strength indication measurement, or a time of flight measurement. The at least one processor may be further configured to query a data structure stored in the memory based on an identification value associated with the at least one second transceiver. The at least one processor may be further configured to determine a context associated with the mobile device, and determine the threshold value based on the context.

An example apparatus according to the disclosure includes a memory, at least one transceiver, at least one processor communicatively coupled to the memory and the at least one transceiver, and configured to determine an angle to a mobile device relative to a reference point with at least a first radio transceiver, obtain a measured distance to the mobile device with at least a second radio transceiver, obtain a calibration distance based at least in part on the angle to the mobile device, compute a validation distance based at least in part on a difference between the measured distance and the calibration distance, and validate the mobile device based at least in part on a comparison of the validation distance and a threshold value.

Implementations of such an apparatus may include one or more of the following features. The at least one processor may be further configured to determine the mobile device is located within a predefined angular segment. The second radio transceiver may be configured to utilize a wider bandwidth than the first radio transceiver. The at least one processor may be further configured to obtain the calibration distance from a data structure stored in the memory based at least in part on the angle to the mobile device. The first radio transceiver and the second radio transceiver may be disposed in a vehicle, and the calibration distance may be based on a distance between the second radio transceiver and a perimeter of the vehicle. The first radio transceiver and the second radio transceiver may be disposed in a vehicle, and the calibration distance may be based on a distance between the reference point and a perimeter of the vehicle. The first radio transceiver and the second radio transceiver may be disposed in a vehicle, and the threshold value may be based on a context of the vehicle. The first radio transceiver may be proximate to an entrance to a fixed structure, and the second radio transceiver may be a radio access point within the fixed structure. The at least one processor may be further configured to determine a round trip time between the second radio transceiver and the mobile device.

Items and/or techniques described herein may provide one or more of the following capabilities, as well as other capabilities not mentioned. A vehicle, or other structure, may utilize a digital key system. A mobile device such as a smart phone, smart watch, or key fob, may enable a user to access the vehicle or other structures. The digital key system may utilize a first radio access technology to determine a first range to the mobile device. A second radio access technology may be used to determine a second range to the mobile device. Antennas and transceivers for the first and second radio access technologies may be in different locations. The digital key system may utilize one or more data structures to store offset bias values based on the different antenna locations. The mobile device may be validated by the digital key system based on the first range, the second range, and one or more bias values. The combination of the first and second radio access technologies may reduce the threat associated with RITM attacks. Other capabilities may be provided and not every implementation according to the disclosure must provide any, let alone all, of the capabilities discussed.

DETAILED DESCRIPTION

Techniques are discussed herein for validating a mobile device in a passive digital key system. A short-range communication technology such as Bluetooth Low Energy (BLE) technology, UWB, or mmWave technology may be used to validate a mobile device, such as a key fob, in a digital key vehicle system. Current BLE-based digital key systems may utilize multiple BLE transceivers disposed on a vehicle to obtain range estimates to a digital key in any direction relative to a vehicle. In addition to BLE transceivers, a vehicle may also include one or more Wi-Fi based transceivers. The passive digital key systems provided herein utilize a short-range communication assisted Wi-Fi ranging system to reduce the vulnerability to RITM type attacks. In an example, short-range communication (e.g., BLE) ranging measurements, such as Received Signal Strength (RSSI) measurements, may be used to indicate the relative direction of a mobile device (e.g., a digital key) with respect to the vehicle. The distance between a Wi-Fi radio installed in the vehicle and the vehicle perimeter area from which the mobile device is detected by the short-range communication system, may be subtracted from a measured distance using Wi-Fi to minimize the bias at different directions around the vehicle. Other range estimation methods (e.g., Ultra-Wide Band (UWB) based schemes) which may also be impacted by biases associated with the location of transceivers and/or antenna modules relative to the vehicle frame may also benefit from the proposed assistance from short-range transceivers. For example, automobile manufacturers may install UWB radios for digital key applications, however, due to cost constraints, such applications may have a limited number of UWB radios (e.g., 4 UWB radios). The locations of the UWB radios and corresponding antenna modules may cause bias errors relative to the perimeter of the vehicle and the short-range transceivers, and thus the techniques provided herein may be used for UWB based security schemes. Other combinations of radio technologies may also be used. For example combinations of WiFi and BLE, WiFi and UWB, UWB and BLE, and other long or medium and short range technologies may be used. These techniques and configurations are examples, and other techniques and configurations may be used.

Figure 1:
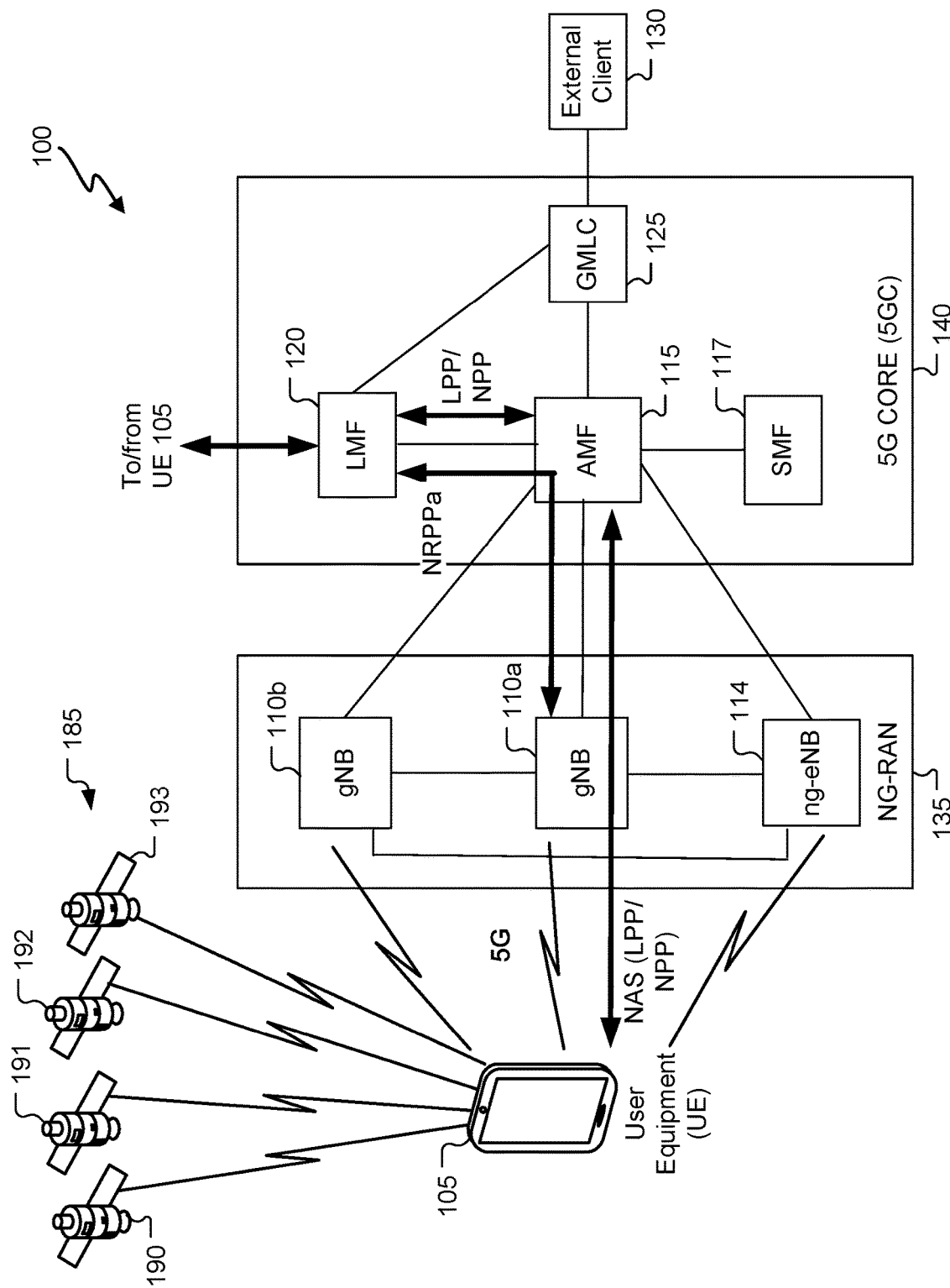
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, 5G CV2X Sidelink, 5G ProSe, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
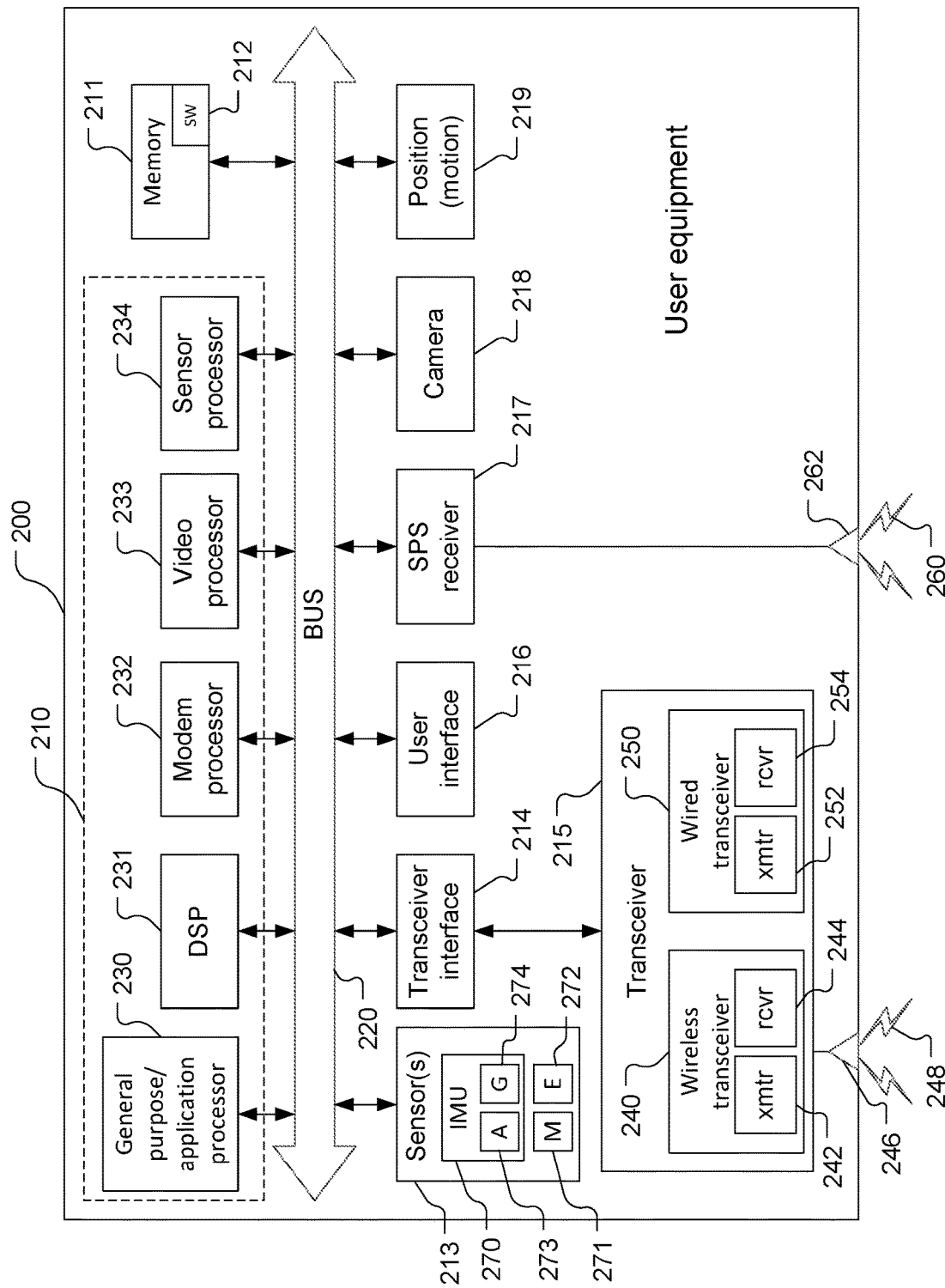
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations. The sensors processing subsystem may be embedded in a low power core that facilitates continuous logging and derivation of sensor parameters required for high level functions such as temperature sensing, location assist or dead reckoning.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee, 5G CV2X (Sidelink), 5G ProSe, etc. New Radio may use mm-wave frequencies and/or sub-6 GHz frequencies. The wired transceiver 250 may include a transmitter 252 and a receiver 254 configured for wired communication, e.g., with the network 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
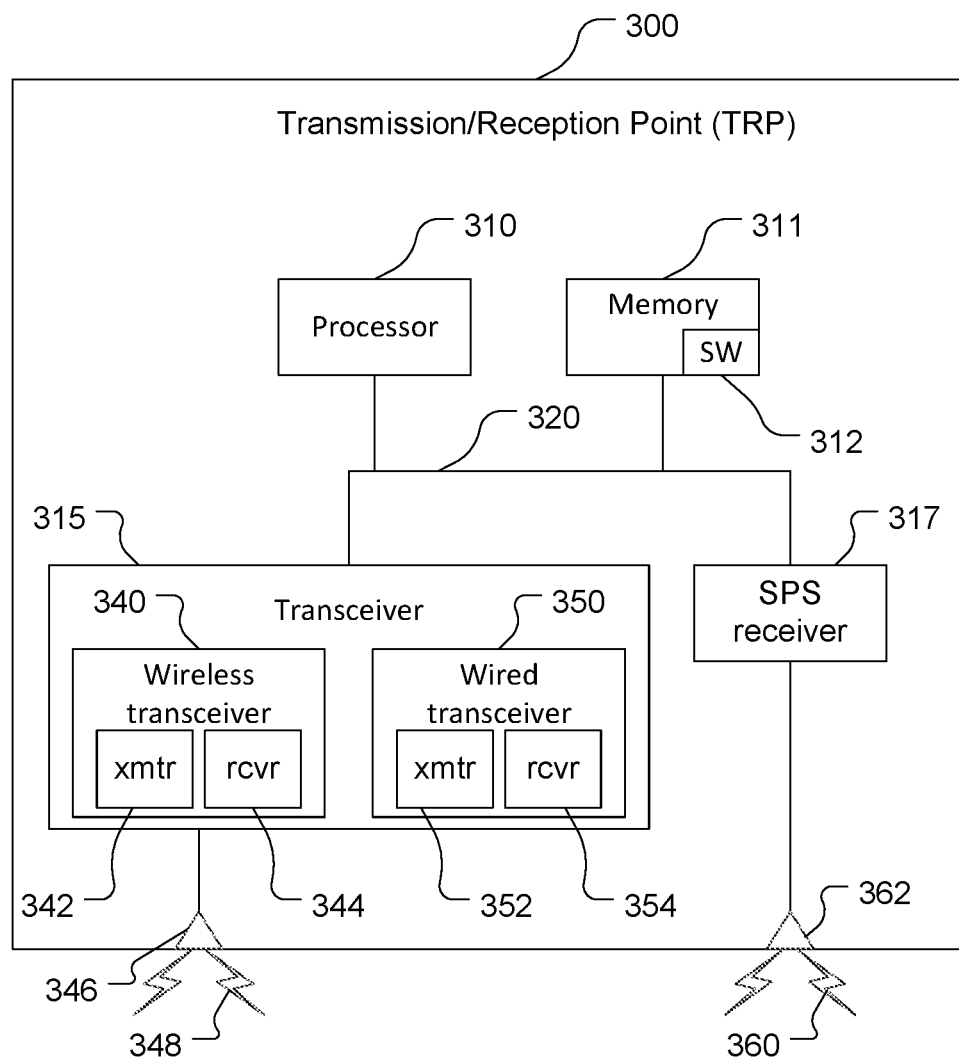
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), 802.15, Bluetooth®, Zigbee, UWB, mmWave, etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
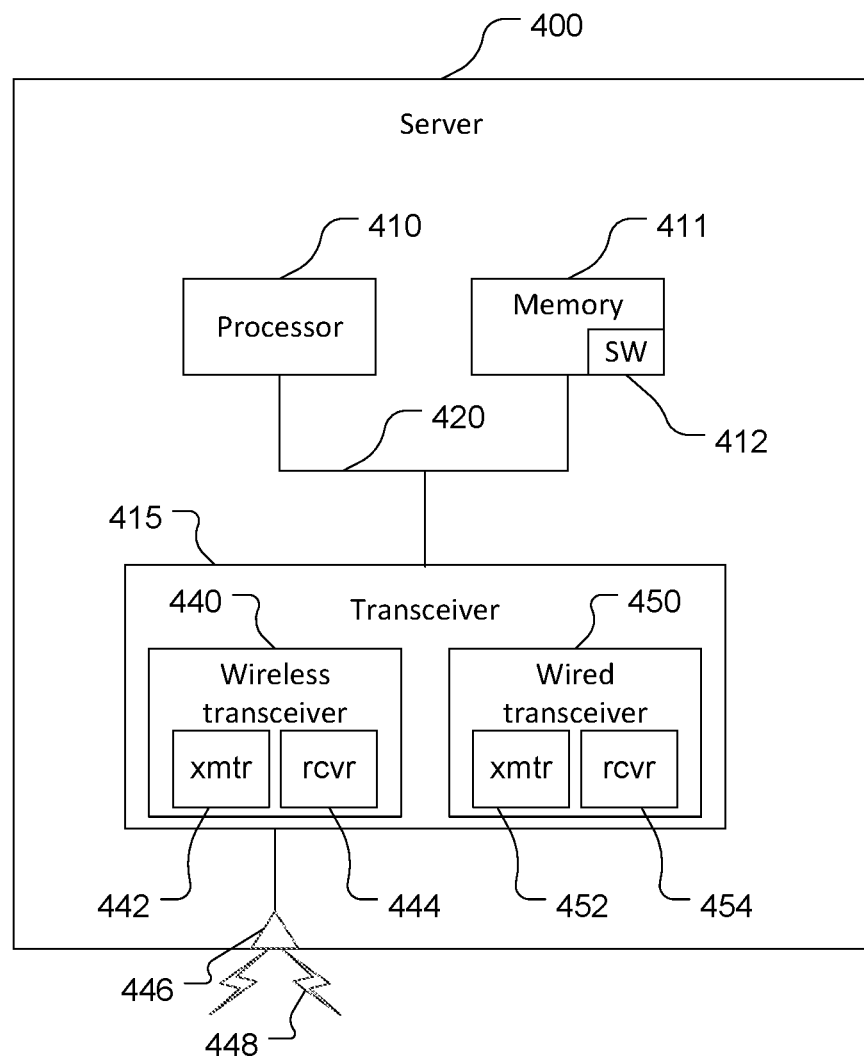
FIG. 4 is a block diagram of components of an example server.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, BLE, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
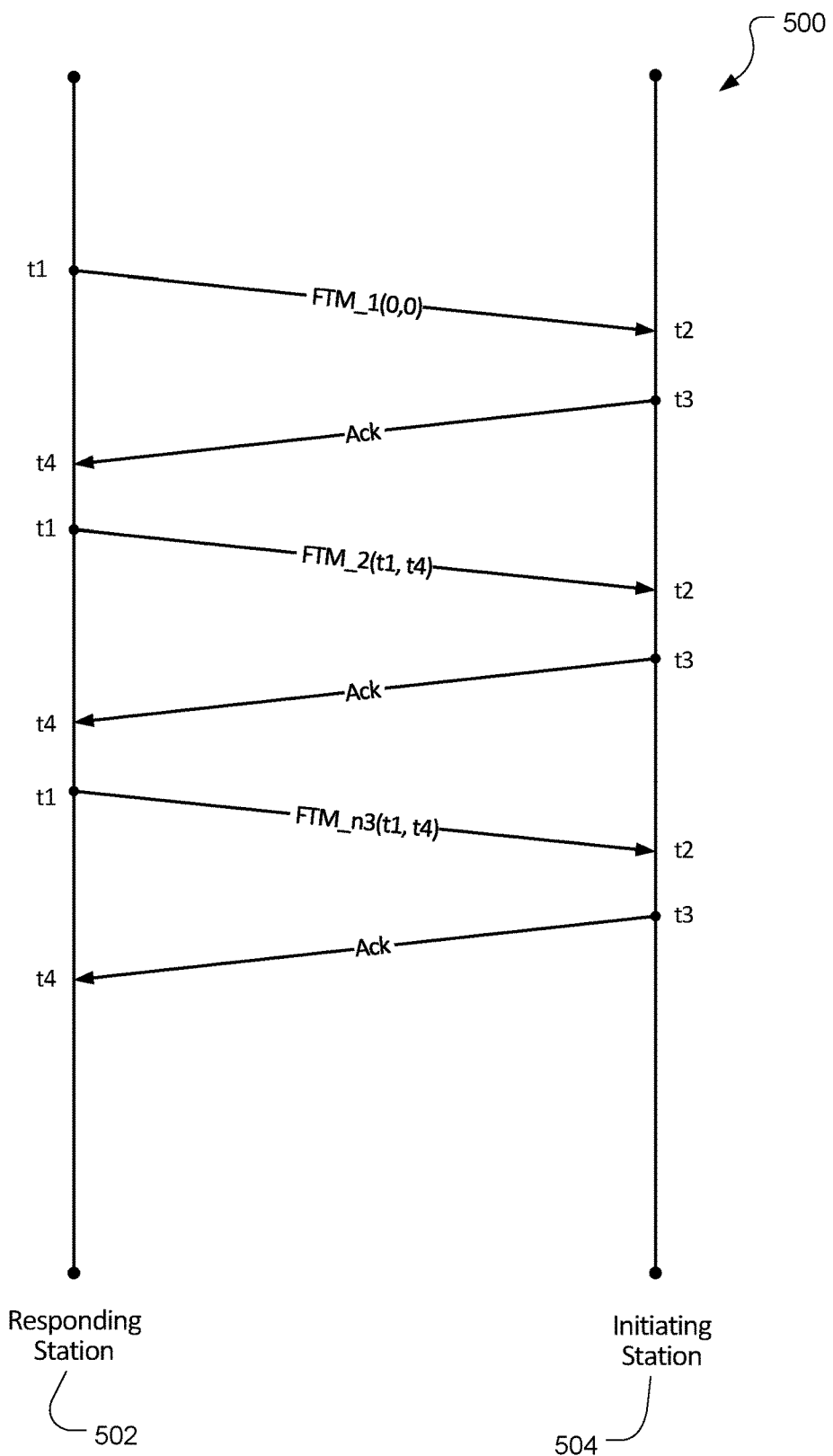
FIG. 5A is an example message flow for a round trip time measurement session.

Referring to FIG. 5A, an example of a conceptual diagram of a round trip time measurement session 500 is shown. The general approach includes a Responding station 502 and an Initiating station 504. The responding station 502 and the initiating station 504 may be a UE such as the UE 200, or other wireless mobile device configured to participate in time-of-flight based positioning. In an example, and not a limitation, the RTT measurement session 500 may be based on Fine Timing Measurement messages exchanged between the responding and initiating stations 502, 504. Other messages and signals such as positioning reference signals (PRS), sounding reference signals (SRS), Infra-Red camera signals, or other reference signals may be used to determine time-of-flight information between two UEs. The RTT session 500 may utilize a FTM Protocol (e.g., 802.11mc D4.3 section 10.24.6) to enable two stations to exchange round trip measurement frames (e.g., FTM frames). The initiating station 504 may compute the round trip time by recording the TOA (i.e., t2) of the FTM frame from the responding station 502 and recording the TOD of an acknowledgement frame (ACK) of the FTM frame (i.e., t3). The responding station 502 may record the TOD of the FTM frame (i.e., t1) and the TOA of the ACK received from initiating station 504 (i.e., t4). Variations of message formats may enable the timing values to be transferred between the responding and initiating stations 502, 504. The RTT is thus computed as:

$$\text{RTT} = [(t4-t1)-(t3-t2)] \tag{1}$$

The RTT session 500 may allow the initiating station 504 to obtain its range with the responding station 502. An FTM session is an example of a ranging technique between the responding station 502 and the initiating station 504. Other ranging techniques such as TDOA, TOA/TOF may also be used to determine the relative positions of the two stations. Other signaling may also be used to enable a negotiation process, the measurement exchange(s), and a termination process. For example, Wi-Fi 802.11az ranging Null Data Packet (NDP) and Trigger-Based (TB) Ranging NDP sessions may also be used.

Figure 5B:
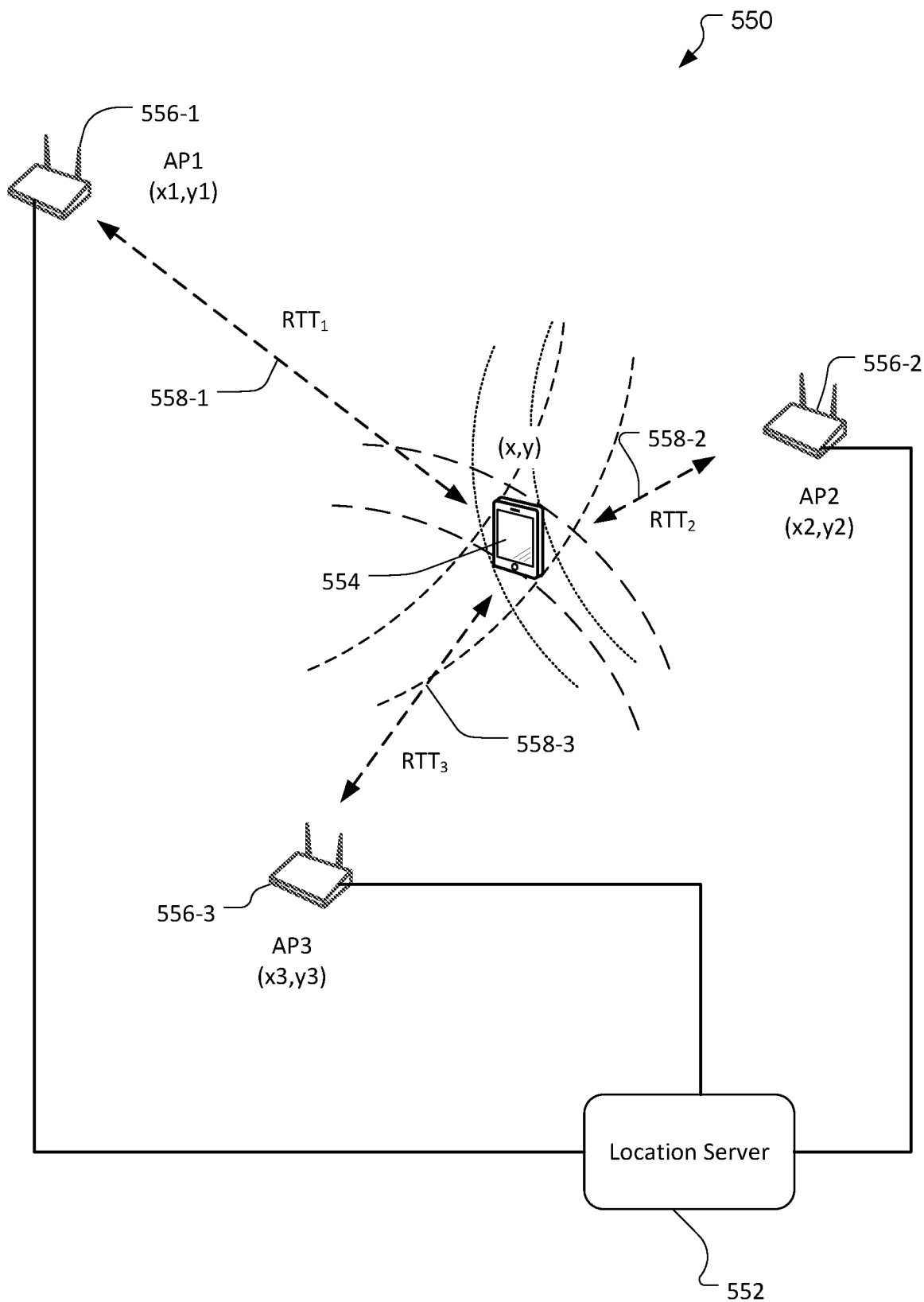
FIG. 5B is an example Wi-Fi wireless communication system.

Referring to FIG. 5B, an example Wi-Fi wireless communications network 550 according to aspects of the disclosure is shown. In the example of FIG. 5B, a location server 552 (which may correspond to any of the servers described herein) is configured to calculate a position estimate for a UE 554, or assist another entity (e.g., an AP, the UE 554, another UE, a location server, a third party application, etc.) to calculate a position estimate of the UE 554. The UE 554 may communicate wirelessly with a plurality of Wi-Fi access points 556-1, 556-2, and 556-3 (which may correspond to any of the TRPs 300 described herein) using RF signals and standardized protocols for the modulation of the RF signals and the exchange of information packets. By extracting different types of information from the exchanged RF signals, and utilizing the layout of the Wi-Fi wireless network 550 (i.e., the AP's locations, geometry, etc.), the location server 552 may determine a position of the UE 554, or assist in the determination of the position, in a predefined reference coordinate system. In an aspect, the location server 552 may specify the position using a two-dimensional coordinate system; however, the aspects disclosed herein are not so limited, and may also be applicable to determining positions using a three-dimensional coordinate system, if the extra dimension is desired. Additionally, while FIG. 5B illustrates one UE 554 and three AP 556-1, 556-2, 556-3, as will be appreciated, there may be more UEs 554 and more base stations.

To support position estimates, the APs 556-1, 556-2, 556-3 may be configured to broadcast reference RF signals to UEs in their coverage area to enable a UE 554 to measure characteristics of such reference RF signals. For example, the UE 554 may measure the ToA and or RSSI of specific reference RF signals transmitted by at least three different APs and may use the RTT positioning method to report these ToAs (and additional information) back to the location server 552 (e.g., via a serving AP). In order to determine the position (x, y) of the UE 554, the entity determining the position of the UE 554 needs to know the locations of the APs 556-1, 556-2, 556-3, which may be represented in a reference coordinate system as $(x_k, y_k)$, where k=1, 2, 3 in the example of FIG. 5B. Where one of the APs 556-2 (e.g., the serving AP) or the UE 554 determines the position of the UE 554, the locations of the involved APs 556-1, 556-3 may be provided to the serving AP 556-2 or the UE 554 by the location server 552 (which has information of the network geometry). Alternatively, the location server 552 may determine the position of the UE 554 using the known network geometry.

Either the UE 554 or the respective APs 556-1, 556-2, 556-3 may determine the distance ($d_k$, where k=1, 2, 3) between the UE 554 and the respective APs 556-1, 556-2, 556-3. In an aspect, determining the RTT 558-1, 558-2, 558-3 of signals exchanged between the UE 554 and any AP 556-1, 556-2, 556-3 can be performed and converted to a distance ($d_k$). RTT techniques can measure the time between sending a signaling message (e.g., reference RF signals) and receiving a response. The FTM procedures in FIG. 5A are an example of a RTT technique. These methods may utilize calibration to remove any processing and hardware delays. In some environments, it may be assumed that the processing delays for the UE 554 and the APs 556-1, 556-2, 556-3 are the same.

Once each distance $d_k$ is determined, the UE 554, a AP 556-1, 556-2, 556-3, or the location server 552 can solve for the position (x, y) of the UE 554 by using a variety of known geometric techniques, such as, for example, trilateration. From FIG. 5B, it can be seen that the position of the UE 554 ideally lies at the common intersection of three semicircles, each semicircle being defined by radius $d_k$ and center $(x_k, y_k)$, where k=1, 2, 3.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE 554 from the location of a AP 556-1, 556-2, 556-3). The intersection of the two directions at or near the point (x, y) can provide another estimate of the location for the UE 554. In an example, a single distance and AoA with one of the APs may be used to determine an estimated position of the UE 554.

Figure 6:
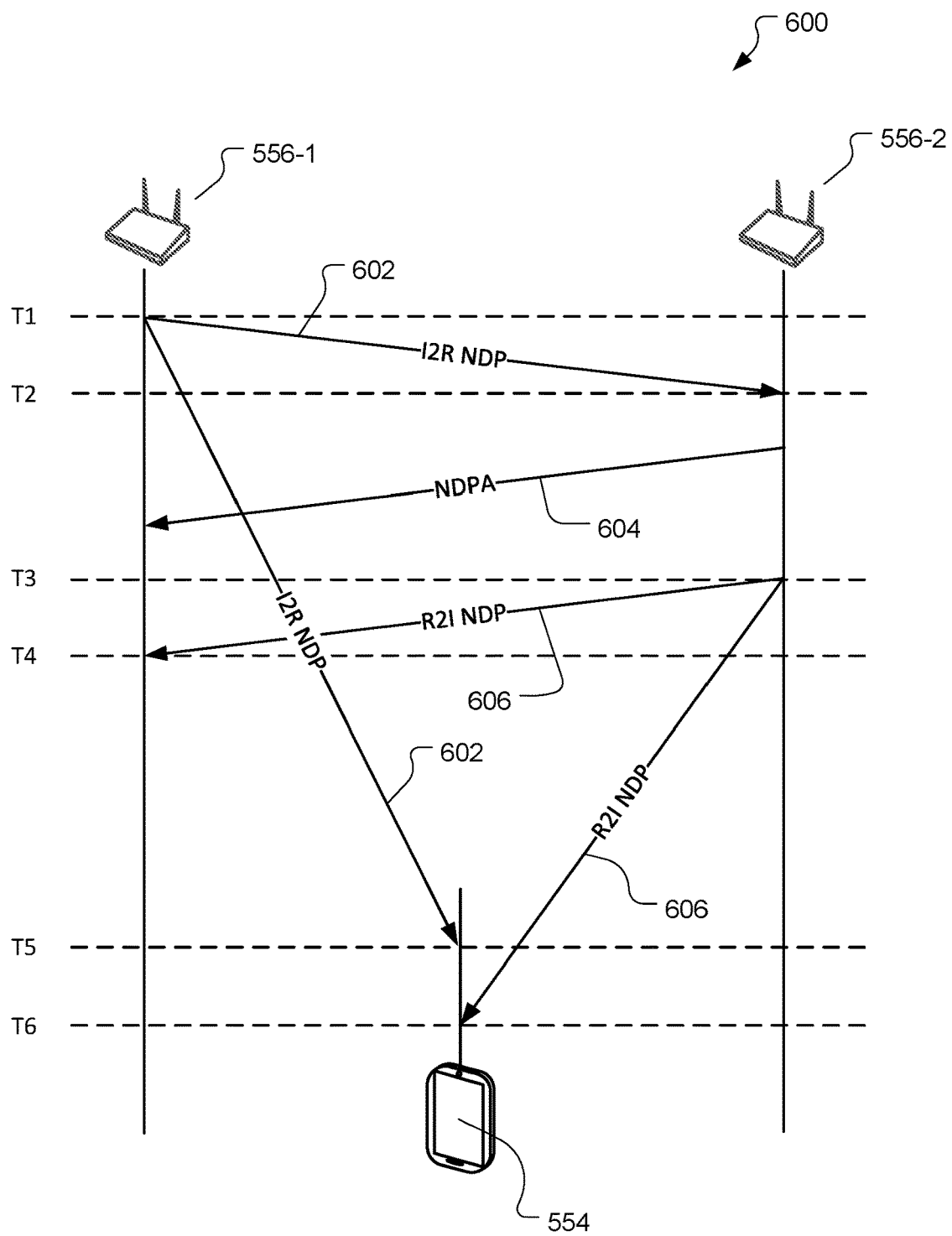
FIG. 6 is an example message flow for passive positioning with a user equipment.

Referring to FIG. 6, with further reference to FIG. 5B, an example message flow 600 for passive positioning with a plurality of APs is shown. The message flow 600 includes the first AP 556-1, the second AP 556-2, and the UE 554. In the message flow 600, the AP network 550 provides passive positioning service by exchanging NDP sounding packets between the APs, and client UEs listen to the packets. The location of the UEs may be estimated based on the received sounding packets. For example, the AP network 550 may utilize the passive positioning techniques described in 802.11az. In an example, the AP locations may be broadcast to the UEs. In a digital key application, the UE 554 may be configured to feedback a measurement information to controller (not shown in FIG. 6). In an example, the message flow 600 includes transmitting a I2R NDP message 602 at time T1 with the first AP 556-1, which is received by the second AP 556-2 at time T2. The UE 554 is in a position to receive the I2R NDP 602 at time T5. The second AP 556-2 may send an acknowledgment message such as the NDPA message 604. The second AP 556-2 is configured to transmit an R2I NDP message 606 at time T3, which is received by the first AP 556-1 at time T4. The UE 554 is in a position to receive the R2I NDP 606 at time T6. The first AP 556-1 and/or the second AP 556-2 may be configured to indicate (e.g., via broadcasting or other signaling) the turnaround time (i.e., T3−T2), the time of flight (i.e., T2−T1), and other assistance data (e.g., locations of the APs 556-1, 556-2). In an example, the first AP 556-1 may indicate the time of flight, and the second AP 556-2 may indicate the turnaround time. In an embodiment, the UE 554 is configured to perform RSTD measurements based on the time of arrivals T5 and T6. In an embodiment, the UE 554 may be configured to store the respective ToAs (T5, T6) with station ID information (e.g., the MAC IDs of the respective first and second APs 556-1, 556-2) in a local data structure, and then provide the data to the digital key system controller.

Figure 7:
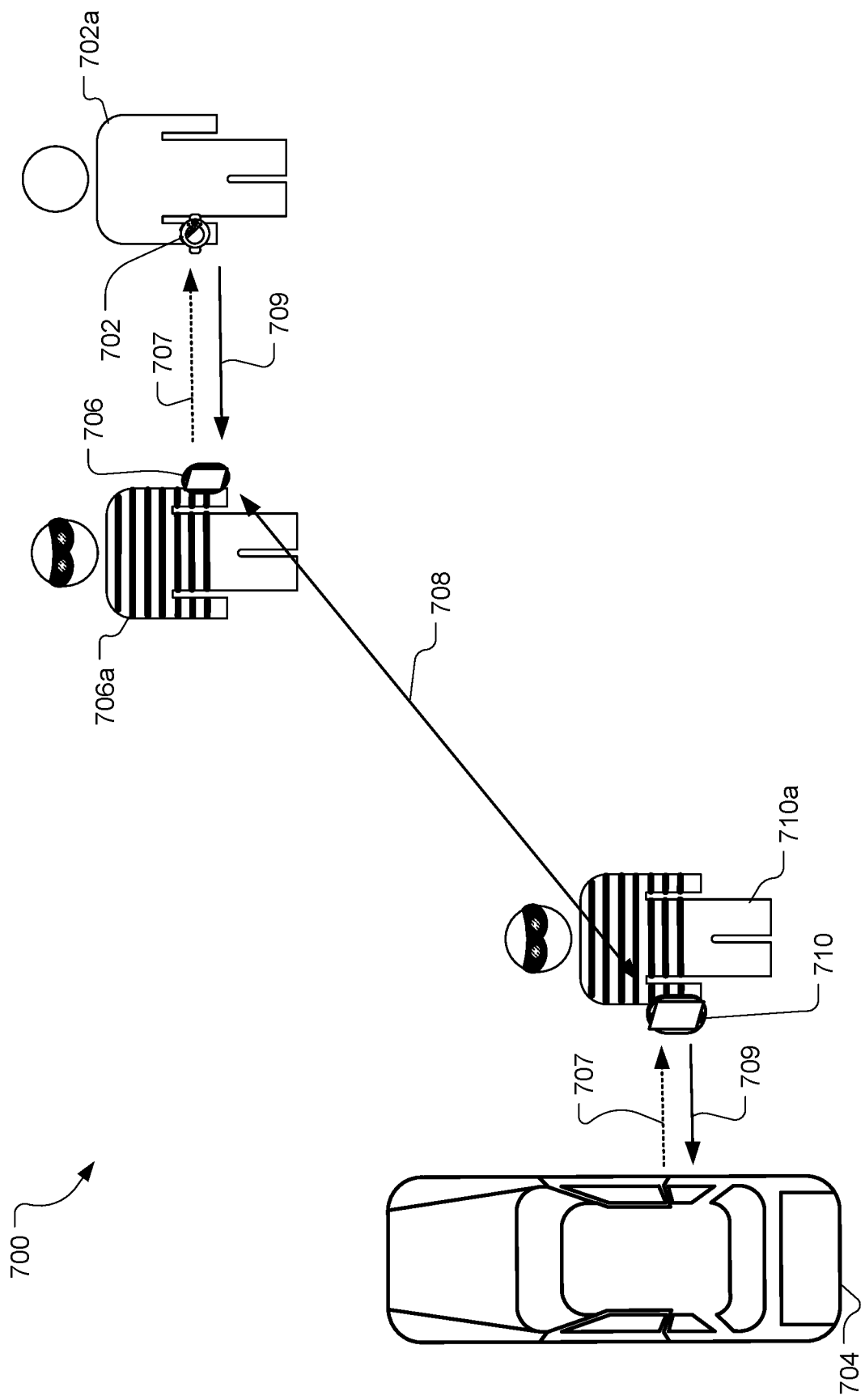
FIG. 7 is a diagram of an example relay attack in a wireless digital key system.

Referring to FIG. 7, a diagram 700 of a relay attack in a wireless digital key system is shown. In general, traditional mechanical keys are being replaced by electronic versions which is known as a key fob or a remote. Some remote keyless systems (RKS) may use wireless technologies such as BLE and a mobile device such as a smart phone, smart watch, or other mobile transceivers may be used as a key. For example, a mobile device 702 (e.g., a smart watch) may be worn by a user 702a and a RKS configured vehicle 704 may automatically unlock or lock based on the proximity of the mobile device 702. In an example, the engine ignition system may also utilize the RKS to enable the engine start process. The mobile device 702 may be configured to listen for signal broadcast from the vehicle 704 and to respond by transmitting an encrypted code. In a Relay Station Attack (RSA), thieves may spoof the signals transmitted between the mobile device 702 and the vehicle 704. For example, assuming the user 702a has walked away from the vehicle 704 and is out of communication range, a first thief 710a may utilize a first wireless device 710 to send a general RKS signal to the vehicle 704. The vehicle 704 may reply with a request for authentication 707, and the first wireless device 710 may utilize a device-to-device (D2D) link 708 to transmit the request to a second wireless device 706, which is under the control of a second thief 706a. The second thief 706a may be following the user 702a (e.g., sitting near them in a restaurant, walking behind them in a crowd, etc.). The second wireless device 706 may relay the request for authentication 707 to the mobile device 702, and the mobile device 702 may respond with the credentials 709. The second wireless device 706 relays the credentials to the first wireless device 710 via the link 708. The first wireless device 710 transmits the credentials 709 to unlock the vehicle 704. The relay attack in FIG. 7 is an example, and the signals and sequences may be used in various relay attack schemes. In general, however, such relay attacks occur when the vehicle owner, or the corresponding fob/mobile device, is located at a distance from the vehicle.

Figure 8:
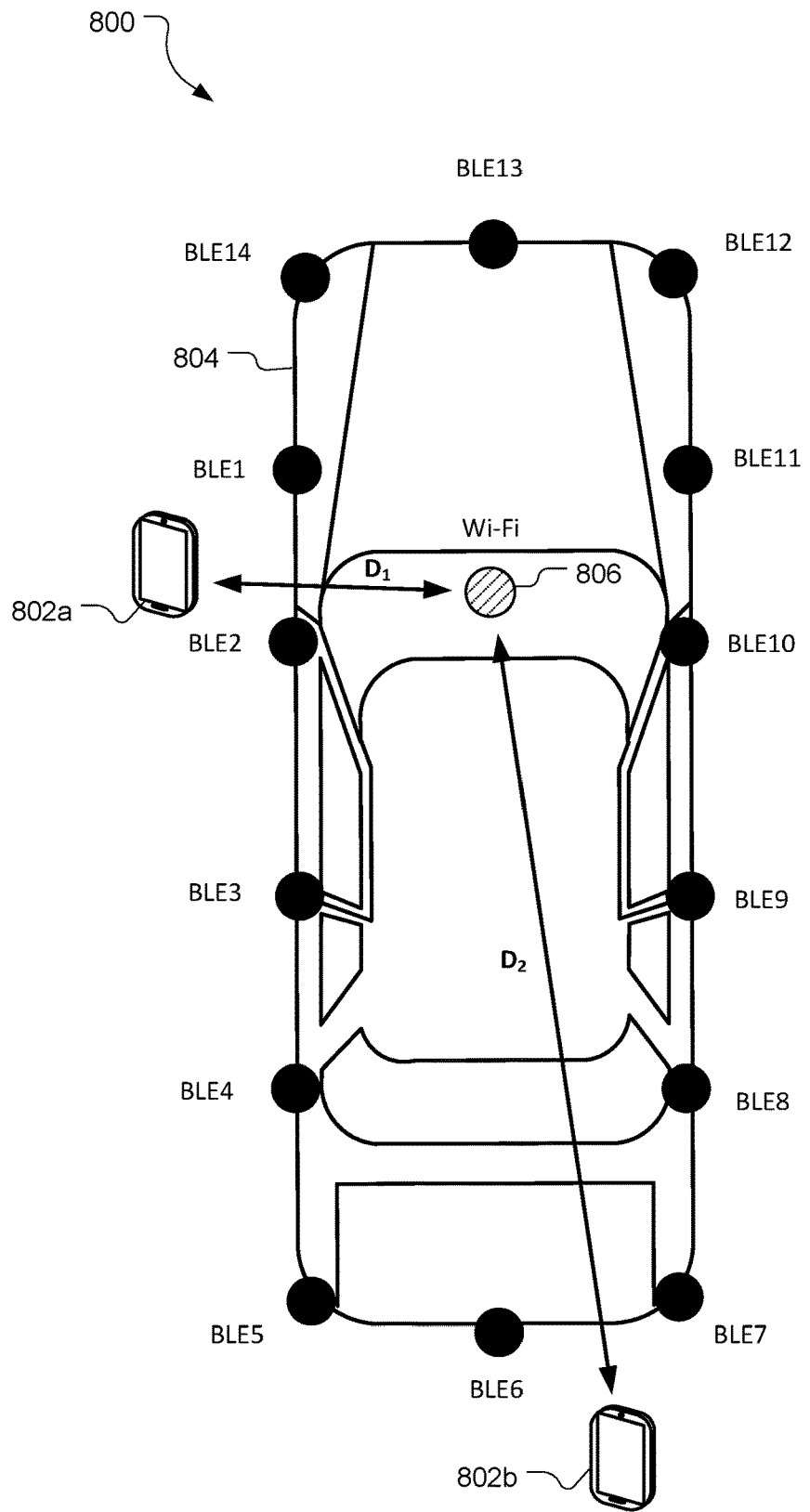
FIG. 8 is a diagram of an example vehicle with multiple wireless transceivers.

Referring to FIG. 8, a diagram 800 of an example vehicle 804 with multiple wireless transceivers is shown. For example, the vehicle 804 includes a plurality of short-range transceivers and at least one long or medium range transceiver (i.e., a longer range that the short-range transceivers). The short-range transceivers in the diagram 800 are depicted as BLE transceivers (i.e., BLE1 to BLE14), but other short-range communications technologies may be used. The long or medium range transceiver in the diagram is a Wi-Fi transceiver 806 may include some or all of the components of the TRP 300, and the TRP 300 may be an example of the Wi-Fi 806. BLE transceivers and the Wi-Fi transceiver 806 may be communicatively coupled to a controller (not shown in FIG. 8). The BLE transceivers may be system on chip configurations, or other off-the-shelf BLE circuits configured to measure signal strength (e.g., TI CC2540/41, Nordic nRF51822, Cypress Semi PSoC 4 BLE, etc.). A plurality of BLE transceivers may be installed on the perimeter of the vehicle 804 and configured to detect proximate mobile devices. In an embodiment, the BLE transceivers may be configured to obtain ranging/positioning measurements (e.g., RSSI) from the proximate mobile devices. For example, a first mobile device 802a may be approaching the left side of the vehicle 804 and a first BLE transceiver BLE1 and a second BLE transceiver BLE2 may provide an indication of their respective RSSI measurements to the controller. Other signals and measurements may also be used to indicate the detection of a mobile device by one or more BLE transceivers. The controller may be configured to determine the relative location of the first mobile device 802a based on the RSSI measurements (e.g., between BLE1 and BLE2). Similarly, a second mobile device 802b may be approaching the vehicle 804 from the rear (e.g., to open the trunk), and a sixth BLE transceiver BLE6 and a seventh BLE transceiver BLE7 may provide respective detection indications and/or RSSI measurements to the controller. Other BLE transceivers may also provide their detection indications and/or RSSI measurements to the controller. Since the BLE transceivers are disposed on the perimeter of the vehicle 804, the respective relative distances of the mobile devices 802a, 802b to the vehicle may be approximately equal because they are based on distances measured from the perimeter of the vehicle.

The Wi-Fi transceiver 806 may be configured to determine ranges to the mobile devices 802a, 802b based on, for example, RTT exchanges such as described in FIG. 5A. Since the antenna module for the Wi-Fi transceiver 806 may be in a central location of the vehicle 804, the measured ranges to the respective mobile devices 802a, 802b may be different based on the relative location of the Wi-Fi transceiver 806 to the perimeter of the vehicle 804. For example, a first distance $D_1$ between the Wi-Fi transceiver 806 and the first mobile device 802a may be less than a second distance D2 between the Wi-Fi transceiver 806 and the second mobile device 802b. The passive digital key systems described herein may utilize detection information obtained from the BLE transceivers (e.g., BLE1 ... BLE14) and the range measurement obtained from the Wi-Fi transceiver 806 to validate the location of a mobile device and reduce the potential of a relay attack such as depicted in FIG. 7.

Figure 9:
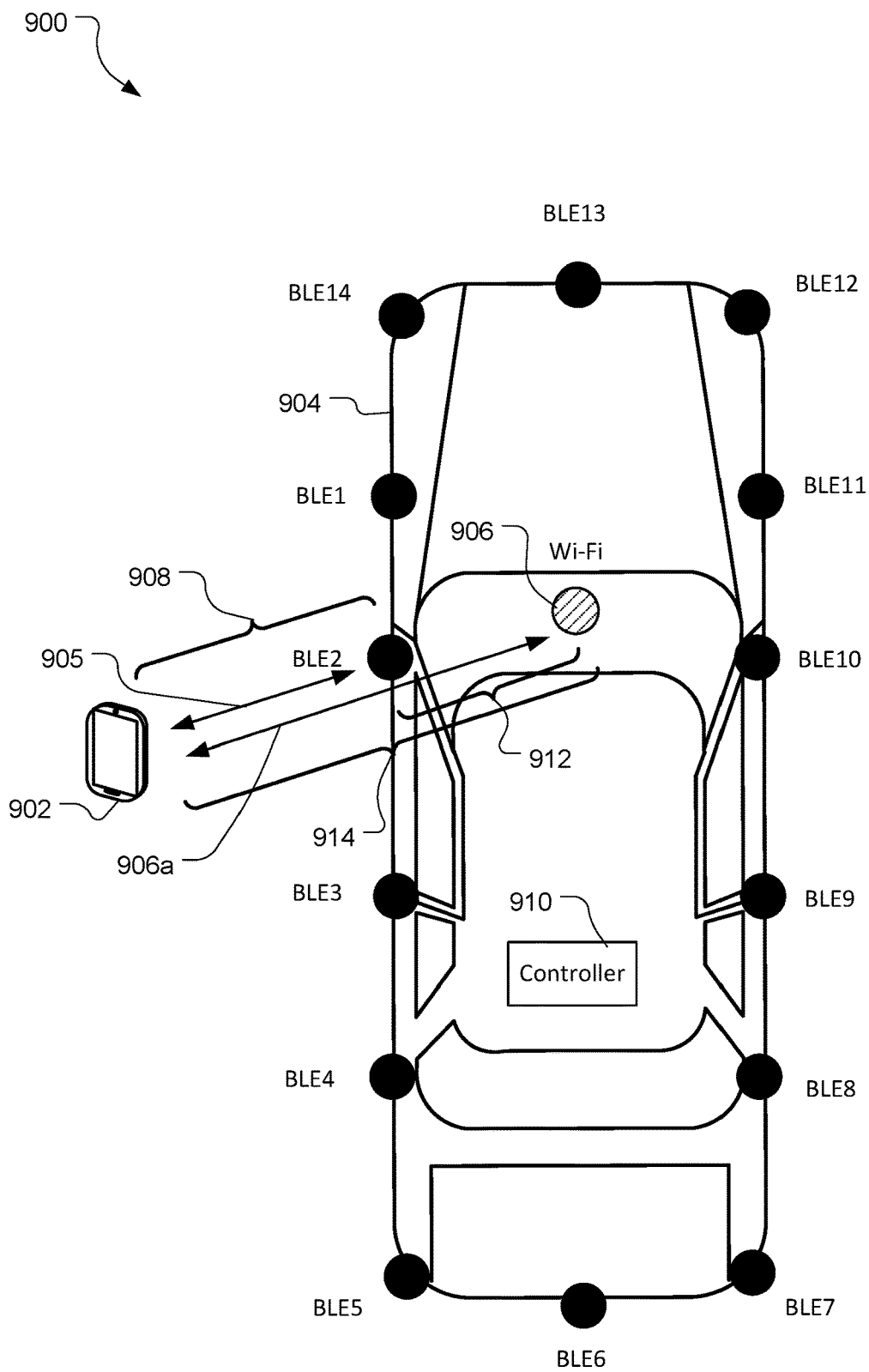
FIG. 9 is a diagram of a first example of a passive digital key system in a vehicle.

Referring to FIG. 9, a diagram 900 of a first example passive digital key system in a vehicle 904 is shown. The vehicle 904 includes a plurality of short-range transceivers (i.e., BLE1 BLE14) and at least one medium/long range transceiver (i.e., a Wi-Fi transceiver 906). Other short and medium/long range communications technologies may also be used. The Wi-Fi transceiver 906 may include some or all of the components of the TRP 300, and the TRP 300 may be an example of the Wi-Fi transceiver 906. BLE transceivers and the Wi-Fi transceiver 906 may be communicatively coupled to a controller 910. The controller 910 may include some or all of the components of the server 400, and the server 400 may be an example of the controller 910. The controller 910 may be configured to execute a digital key unlock system (DKUS) for the vehicle 904. The BLE transceivers may be installed on the perimeter of the vehicle 904 and configured to obtain ranging/positioning measurements (e.g., RSSI) from approaching mobile devices such as described in FIG. 8. In an embodiment, the BLE transceivers and the controller 910 may be configured obtain RSSI measurements 905 and to detect when a mobile device 902 is close to the vehicle 904. When an RSSI based range estimate 908 is within a threshold (e.g., 0.5 m, 1 m, 2 m, etc.), the DKUS executing on the controller 910 may be configured to wake up the Wi-Fi transceiver 906 and obtain one or more Wi-Fi signals 906a. Based on the location of the Wi-Fi antenna module(s) relative to the perimeter of the vehicle 904, a Wi-Fi range estimate 914 may be larger than the true distance between the mobile device 902 and the vehicle perimeter. For example, a bias value 912 may be based on a distance between the Wi-Fi transceiver 906 and the vehicle perimeter proximate to the mobile device 902 (e.g., based on the RSSI measurements). In an embodiment, the DKUS may include a Vehicle Perimeter Calibration Database, or other data structure, containing a plurality of Vehicle Perimeter Calibration Values. For each Wi-Fi transceiver j, j=1, 2, . . . , N, the DKUS may store M Vehicle Perimeter Calibration Values $D_{ij}$, i=1, 2, . . . , M. Where $D_{ij}$ is the distance from the Wi-Fi transceiver j to the vehicle perimeter closest to the BLE transceiver i. As depicted in the diagram 900, there are 14 BLE transceivers and 1 Wi-Fi transceiver. Thus, 14 Vehicle Perimeter Calibration Values may be stored in the database. For example, a Vehicle Perimeter Calibration Value may be based on the BLE transceiver which reports the strongest RSSI (e.g., BLE2 in FIG. 9). The DKUS may be configured to return the Vehicle Perimeter Calibration Value $D_{ij}$ associated with the appropriate BLE transceiver—Wi-Fi transceiver combination. The distance estimation based on the Wi-Fi measurement is then the Wi-Fi range estimate 914 minus the appropriate Vehicle Perimeter Calibration Value (e.g., the bias value 912 associated with BLE2). In an example, interpolation techniques may be used to determine a calibration value when the mobile device 902 is located between to BLE transceivers.

In an embodiment, the BLE transceivers may be used to detect the presence of the mobile device 902 without determining a distance. For example, transmissions from mobile device 902 may be received by one or more BLE transceivers such as the first BLE transceiver BLE1, the second BLE transceiver BLE2, and the third BLE transceiver BLE3. The detection of the mobile device 902 by the one or more BLE transceivers may be used as a trigger to active the Wi-Fi transceiver 906. The Wi-Fi transceiver may be configured to obtain the range estimate 914 and the controller 910 may apply the bias estimate 912 based on the BLE transceiver with the strongest signal (e.g., BLE2). In an example, the Wi-Fi transceiver 906 may determine an Angle of Arrival (AoA) of signals transmitted by the mobile device 902, and the controller 910 may obtain the bias estimate 912 based on the AoA.

Figure 10:
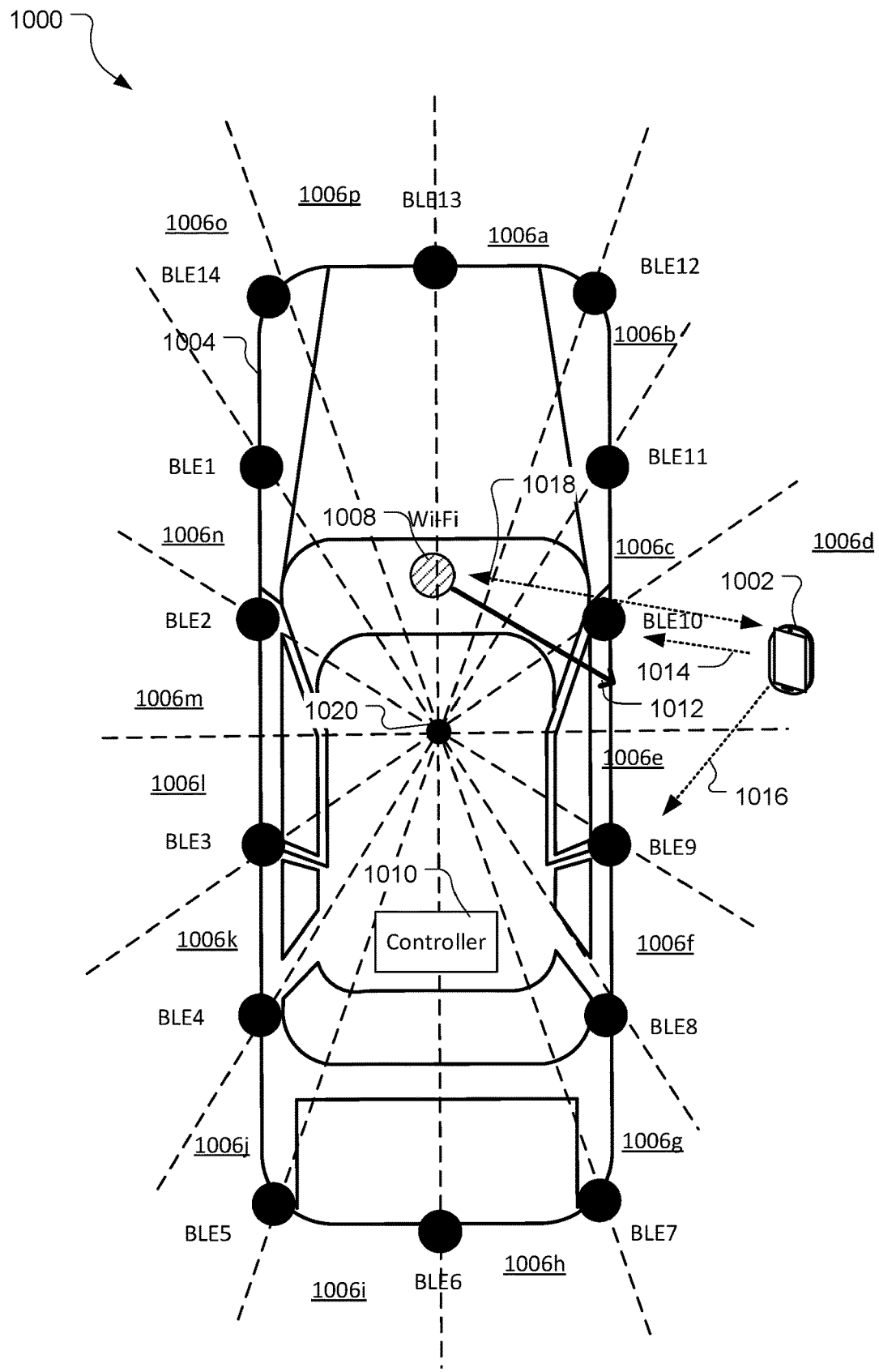
FIG. 10 is a diagram of a second example of a passive digital key system in a vehicle.

Referring to FIG. 10, a diagram 1000 of a second example passive digital key system in a vehicle 1004 is shown. The vehicle 1004 includes a plurality of short-range transceivers (i.e., BLE1 ... BLE14) and at least one medium/long range transceiver (i.e., a Wi-Fi transceiver 1008). The Wi-Fi transceiver 1008 may include some or all of the components of the TRP 300, and the TRP 300 may be an example of the Wi-Fi 1008. BLE transceivers and the Wi-Fi transceiver 1008 may be communicatively coupled to a controller 1010. The controller 1010 may include some or all of the components of the server 400, and the server 400 may be an example of the controller 1010. The controller 1010 may be configured to execute a digital key unlock system (DKUS) for the vehicle 1004. The BLE transceivers may be disposed in known positions relative to a reference point. For example, the BLE transceivers may be installed on the perimeter of the vehicle 1004 and may be configured to detect signals and/or obtain ranging measurements (e.g., RSSI) from approaching mobile devices such as described in FIG. 8. In an embodiment, a Vehicle Perimeter Calibration Database may be defined by angles with respect to reference point such as the center of the vehicle 1004, the location of the Wi-Fi transceiver 1008, or to another pre-defined reference point. For each Wi-Fi transceiver j, j=1, 2, ..., N, the DKUS may be configured to maintain a Vehicle Perimeter Calibration Database that stores L=360/$A_{step}$ Vehicle Perimeter Calibration Values $D_{ij}$, i=1, 2, ..., L. The value of $D_{ij}$ is the distance from the Wi-Fi transceiver j to the vehicle perimeter at angle A=i$A_{step}$, where $A_{step}$ is angle calibration resolution. For example, the diagram 1000 depict 16 angular segments 1006a ... 1006p (i.e., $A_{step}$=22.5 degrees) based on a reference point 1020 (e.g., the center of the vehicle). Thus, there are 16 Vehicle Perimeter Calibration Values stored in the database for each Wi-Fi transceiver). For example, the distance value 1012 is the Vehicle Perimeter Calibration Value for the Wi-Fi transceiver 1008 corresponding to the fourth angular segment 1006d. The controller 1010 may be configured to determine a Wi-Fi based range to an approaching mobile device and modify the range computation based on one or more Vehicle Perimeter Calibration Values associated with the angle of approach.

In operation, one or more of the BLE transceivers BLE1 ... BLE 14 may report an indication of a detected signal 1014 to the controller 1010 to estimate an angle a mobile device 1002 is relative to the vehicle 1004. The controller 1010 may be configured to return the Vehicle Perimeter Calibration Value at an angle closest to the estimated angle. One or more signals 1018 received by the Wi-Fi transceiver 1008 may be used to determine a range to the mobile device 1002. The Wi-Fi range estimate may be adjusted based on the selected Vehicle Perimeter Calibration Value (e.g., based on the fourth angular segment 1006d). In an example, an estimation algorithm may be a weighted average with higher weightings for the BLE transceivers with stronger RSSI measurements. For example, referring to FIG. 10, BLE10 may have the highest weighting as its RSSI measurement 1014 is the strongest, BLE9 may have the 2nd highest weighting as its RSSI measurement 1016 is the 2nd strongest, and BLE5 may have zero weighting as its RSSI measurement (not shown in FIG. 10) is lower than a threshold. In an embodiment, the Wi-Fi transceiver 1008 may be configured to determine the Angle of Arrival (AoA) of signals 1018 received from the mobile device 1002 to estimate the relative angle to the mobile device 1002. The controller 1010 may be configured to utilize the Wi-Fi AoA measurement and the BLE RSSI measurements to improve the angle estimation.

Figure 11:
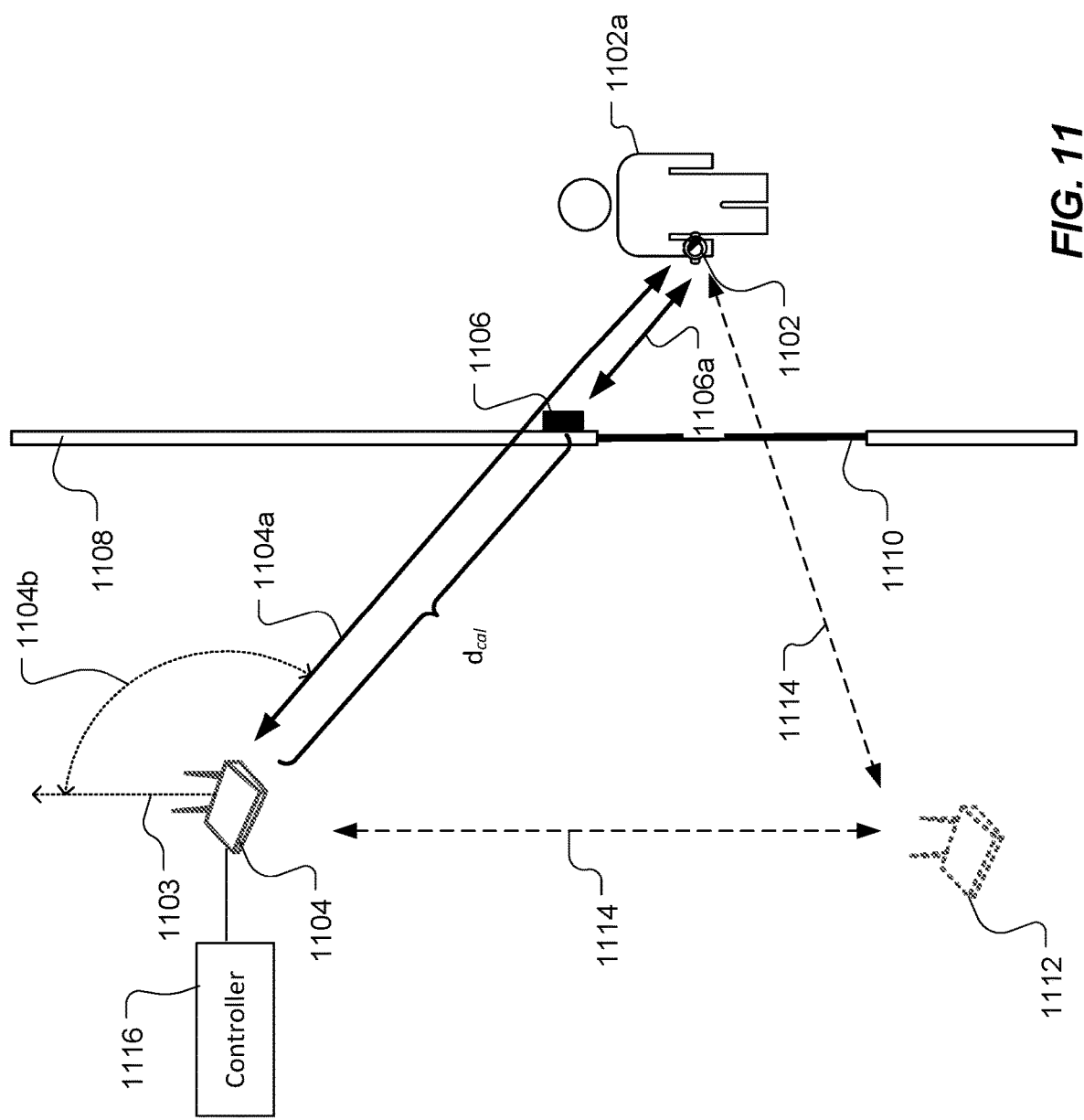
FIG. 11 is a diagram of an example passive digital key system in a fixed structure.

Referring to FIG. 11, a diagram 1100 of an example passive digital key system in a fixed structure is shown. The structures in the diagram 1100 are examples, and not limitations as other security implementations may utilize other physical and electronic structures configured to limit access to physical and virtual areas prior to a validation process. The diagram 1100 includes a mobile device 1102 under the control of a user 1102a. The mobile device 1102 may include some or all of the components of the UE 200, and the UE 200 may be an example of the mobile device 1102. A short-range transceiver 1106 may be disposed on a barrier such as a wall 1108 and configured as a digital key entry system to enable access via a door 1110. A wireless network including a first AP 1104 may be disposed proximate to the door 1110 and may be configure to obtain range and/or angle information for devices proximate to the short-range transceiver 1106. In an example, the first AP 1104 may be configured to exchange Wi-Fi ranging measurements 1104a with the mobile device 1102. In an example, the first AP 1104 may be configured to determine an AoA 1104b of signals transmitted from the mobile device 1102 based on a reference orientation 1103 (e.g., 0 degrees, north, etc.). The short-range transceiver 1106 may detect the presence of the mobile device 1102 via one or more sensing signals 1106a. The short-range transceiver 1106 may be communicatively coupled to a controller 1116 via a wired or wireless connections. The controller 1116 may be a network server, and/or included in the first AP 1104. Upon detection of the mobile device 1102, the controller 1116 may configure the first AP 1104 to determine a range measurement and/or angle measurement for the mobile device 1102. The controller 1116 may also obtain distance and/or calibration values (e.g., $d_{cal}$) associated with the first AP 1104 and the short-range transceiver 1106. The controller 1116 may utilize a comparison of the range measurement 1104a and the distance calibration value to validate that the mobile device 1102 is proximate to the short-range transceiver 1106. An angle calibration value may also be compared to the AoA 1104b to validate the location of the mobile device 1102. For example, the mobile device 1102 may be validated when the comparison of the range measurement 1104a and the distance calibration value are within a pre-determined threshold value (e.g., 0.5 m, 1 m, 2 m, etc). Similarly, the mobile device 1102 may be validated when the measured AoA 1104b and an angle calibration value are within a threshold value (e.g., 1, 2, 5, 10 degrees). Combinations of distance and angle threshold values may also be used to validate the mobile device 1102.

In an embodiment, ranging measurements from other stations in a network may be used to validate the location of the mobile device 1102. For example, a second AP 1112 may be configured to obtain a range and/or AoA based on signals transmitted from the mobile device 1102. In an example, the first AP 1104 and the second AP 1112 may be configured to exchange ranging signals 1114 in a passive positioning scheme such as depicted in FIG. 6. The mobile device 1102 may be configured to determine a RSTD value associated with one or more stations and report corresponding measurement values to the network (e.g., the controller 1116 via the first AP 1104). The RSTD measurements may be used to validate the location of the mobile device 1102. In an example, the short-range transceiver 1106 may be configured to provide encrypted assistance data to the mobile device 1102 to enable the mobile device 1102 to communicate with a Wi-Fi network.

Figure 12:
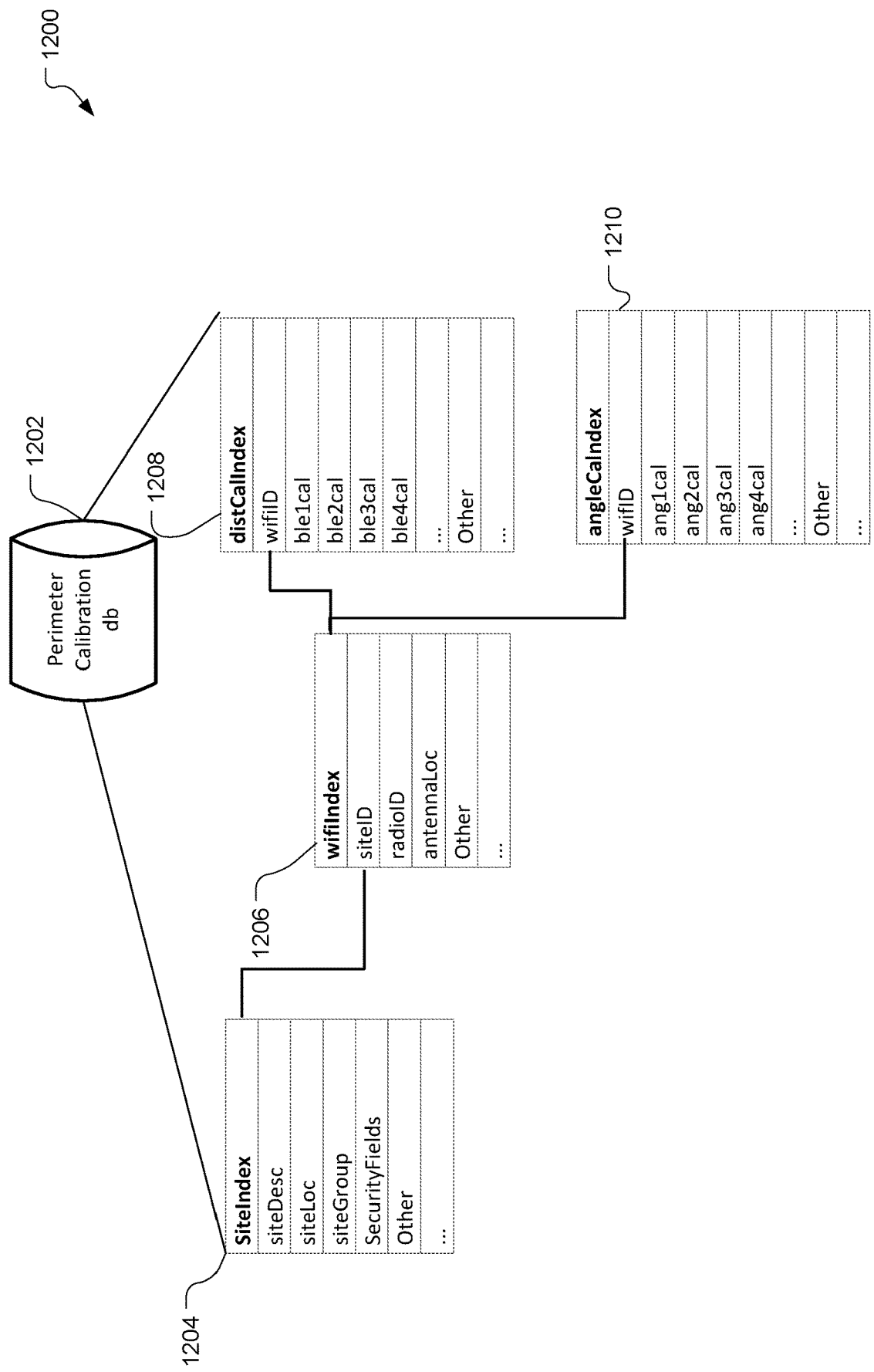
FIG. 12 is an example data structure for a passive digital key system.

Referring to FIG. 12, an example data structure 1200 for a passive digital key system is shown. For example, the data structure may correspond to a Perimeter Calibration Database, such as the vehicle perimeter calibration database as previously described. The one or more objects of the data structure 1200 may persist on a controller 910 or on another networked server 400. The data structure 1200 may be disposed on a memory device 1202 such as a solid state or mechanical hard drive, and may include a plurality of data records stored in a relational database application (e.g., Amazon Aurora, Oracle Database, Microsoft SQL Server, MySQL, DB2, etc.), or stored in one or more flat files (e.g., JSON, XML, CSV, etc.). The table structures and fields in the data structure 1200 are examples, and not a limitation, as other data fields, tables, stored procedures and indexing schemas may be used to construct the data structure 1200. In an example, a site table 1204 may be configured with records associated with different locations, vehicles or other entities configured to utilize a passive digital key system. For example, a siteDesc field may be used to describe a site such as a building name or a vehicle identification number. A siteLoc field may be used to indicate the location of the site such as a street address or geographic coordinates (e.g., lat/long/alt). A siteGroup field may be a linking field to associate a site with a larger group such as a corporate campus or a fleet of vehicles. The group structure may be used to propagate standard parameters to the associated sites. One or more Security Fields may be used to validate or authenticate stations in the passive digital key system. Other fields may also be associated with a site, vehicle or entities utilizing a passive digital key system.

A Wi-Fi station table 1206 may include a wifiIndex field to uniquely identify a Wi-Fi station within a site. A siteID field may be used to link a Wi-Fi station record to the site table 1204. A radioID field may be used to identify a characteristic of a Wi-Fi radio such as a transmitted identification value. An antennaLoc field may indicate the location of an antenna within the site. Other fields may also be used to characterize features of a Wi-Fi station.

One or more calibration tables such as a distance calibration table 1208 and the angle calibration table 1210 may be associated with a Wi-Fi station. The distance calibration table 1208 may include fields indicating the calibration distances (e.g., the perimeter values) for each of the short-range transmitters in a digital key system. For example, a ble1cal field may indicate the perimeter distance for BLE1 based on the location of the linked Wi-Fi station and/or antenna location. Similarly, other BLE calibration fields (e.g., ble2cal, ble3cal, ble4cal, etc.) may contain the perimeter distances for the associated BLE transmitters (e.g., BLE2, BLE3, BLE4, etc.) based on the location information in the associated Wi-Fi station record. The angle calibration table 1210 may include fields indicating perimeter distance values for different angle values around a station. For example, an ang1cal field may indicate the perimeter distance associated with the first angular segment 1006a. Similarly, other angle based calibration fields (e.g., ang2cal, ang3cal, ang4cal, etc.) may contain perimeter distances for the associated angular segments (e.g., 1006b, 1006c, 1006d, etc.) based on the associated Wi-Fi station record (e.g., the wifiID field). Other fields may also be included in records of the distance and angle calibration tables. For example, the positions of the Wi-Fi and BLE transceivers in the site may be stored.

Figure 13:
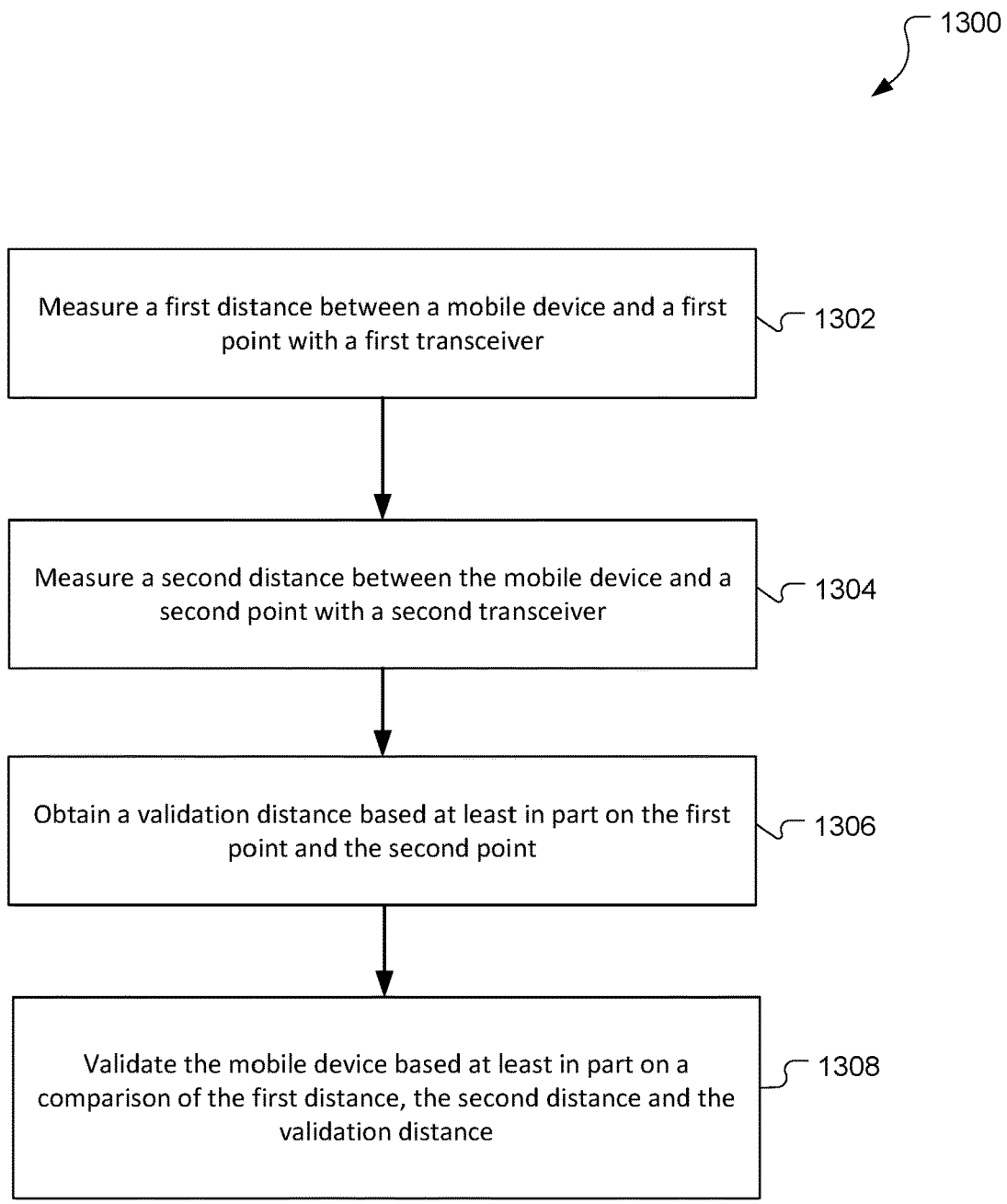
FIG. 13 is a process flow for a method of validating a mobile device with a first example passive digital key system.

Referring to FIG. 13, with further reference to FIGS. 1-12, a method 1300 for validating a mobile device with a first example passive digital key system includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes measuring a first distance between a mobile device and a first point with a first transceiver. One of the controllers 910, 1010, 1116, including the processor 410 and the wireless transceiver 440, may be a means for measuring the first distance. The first transceiver may be a short range radio access technology configured for low transmission power to reduced power consumption. In an embodiment, the wireless transceiver may include one or more BLE transmitters, such as the BLE transmitters BLE1 . . . BLE14 in FIG. 9, and configured to obtain range information associated with the mobile device. For example, the mobile device 902 may be a user equipment such as a smart phone, a smart watch, fitness band, fob, key fob, or other device configured to send and receive signals with two or more radio access technologies. The distance between the mobile device 902 and the first point (e.g., with the first transceiver BLE2) may be based on RSSI measurements obtained at the first transceiver. RSSI measurements may be obtained by other transceivers, such as the neighboring BLE transceivers BLE1 . . . BLE3, or other transceivers on the vehicle 904.

At stage 1304, the method includes measuring a second distance between the mobile device and a second point with a second transceiver. One of the controllers 910, 1010, 1116, including the processor 410 and the wireless transceiver 440, may be a means for measuring the second distance. The second transceiver may be a medium range radio access technology and may have higher transmission powers than the first transceiver. The second transceiver may have a longer communication range than the first transceiver. In an embodiment, the wireless transceiver 440 may include one or more Wi-Fi transceivers, such as the Wi-Fi transceiver 906 in FIG. 9, and configured to obtain range information associated with the mobile device 902. In an example, the second transceiver may be configured to utilize a wider bandwidth than the first transceiver. For example, the second transceiver may be a UWB radio communicatively coupled to the controller 910. The second distance may be based on Wi-Fi ranging techniques such as RSSI and RTT. For example, the Wi-Fi range estimate 914 may indicate the distance between the Wi-Fi transceiver 906 (e.g., the antennas associated with the Wi-Fi transceiver) and the mobile device 902. The second distance may be based on the range between the Wi-Fi transceiver 1008 and the mobile device 1002, or the range between the AP 1104 and the mobile device 1102.

At stage 1306, the method includes obtaining a validation distance based at least in part on the first point and the second point. One of the controllers 910, 1010, 1116, including the processor 410, may be a means for obtaining the validation distance. In an embodiment, the controller 910 may include a perimeter calibration database such as the data structure 1200. The data structure may be queried based on the identities of the first and second transceivers. For example, the Wi-Fi transceiver 906 may be associated with several calibration values (e.g., ble1cal, ble2cal, etc.), and a calibration value for a specific BLE transceiver may be used as the validation distance. In an example, more than one BLE transceivers may be identified and interpolation techniques may be used on the corresponding calibration values to obtain the validation distance. The validation distance may correspond to the bias value 912 indicating the distance from the Wi-Fi transceiver 906 to the perimeter of the vehicle 904 proximate to the mobile device 902, or from the Wi-Fi transceiver 1008 to the perimeter of the vehicle 1004 proximate to the mobile device 1002, or the from the AP 1104 to the short-range transceiver 1106.

At stage 1308, the method includes validating the mobile device based at least in part on a comparison of the first distance, the second distance, and the validation distance. One of the controllers 910, 1010, 1116, including the processor 410, may be a means for validating the mobile device. In an example, the comparison may include subtracting the validation distance obtained at stage 1306 from the second distance obtained at stage 1304, and then comparing the remainder to the first distance obtained at stage 1302. For example, referring to FIG. 9, the difference between the Wi-Fi range estimate 914 and the bias value 912 should be approximately equal to the RSSI range estimate 908. The mobile device may be validated if the values are approximately equal or within a pre-determined threshold (e.g., 0.5 m, 1 m, 2 m, etc.). Upon validation of the mobile device, a DKUS executing on the controller 910 may be configured to unlock the vehicle, enable an ignition system, or perform other security related procedures.

While the example passive digital key system depicted in FIG. 9 utilizes BLE and Wi-Fi radio access technologies, the method 1300 is not so limited as other short, medium and long range, active and/or passive radio access technologies may also be used. For example, the first and second transceivers may be based on D2D, P2P, 5G NR sidelinks, UWB radios, RFID systems, Wi-Fi, BLE, and other radio access technologies configured for RF ranging applications.

Figure 14:
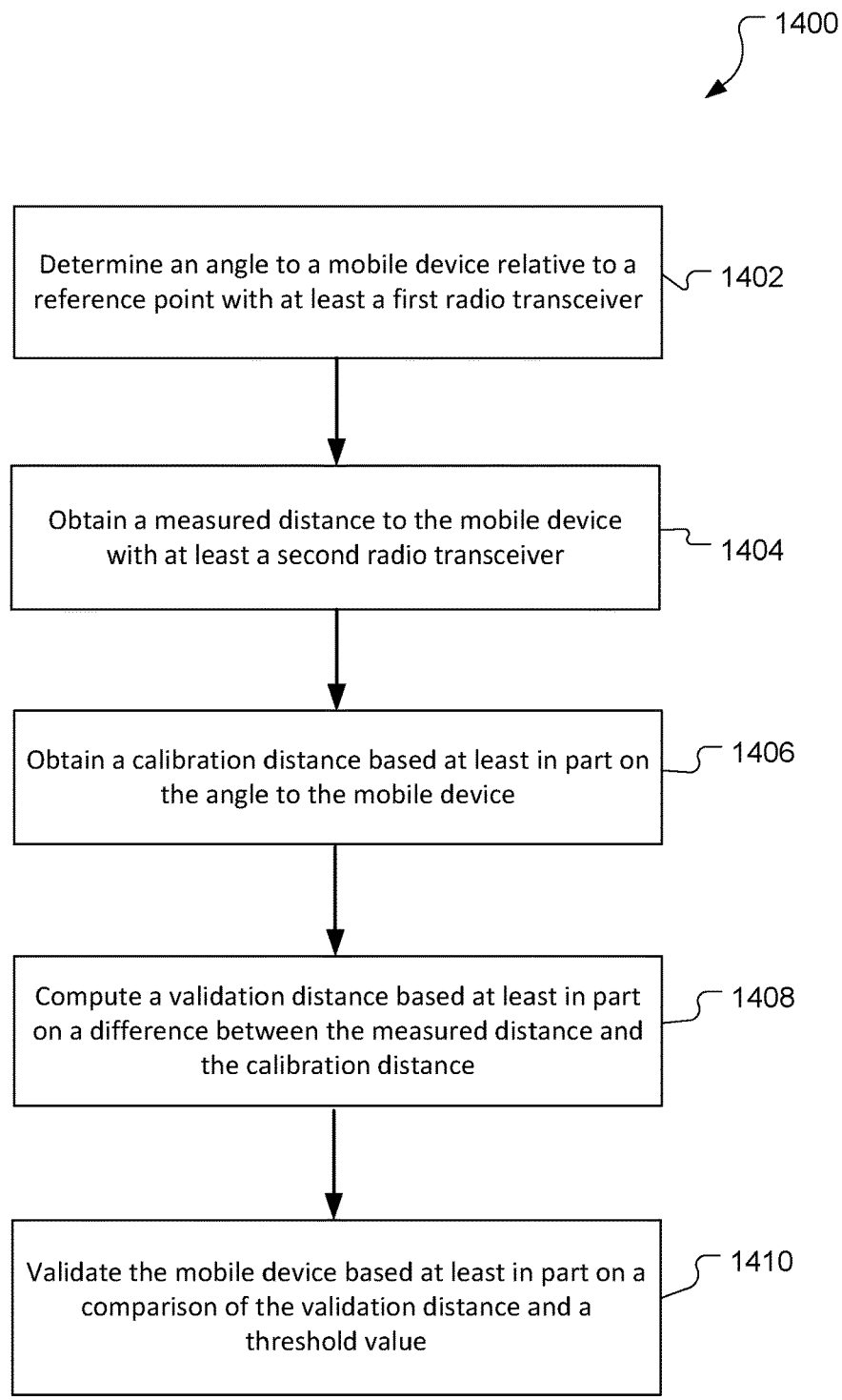
FIG. 14 is a process flow for a method of validating a mobile device with a second example passive digital key system.

Referring to FIG. 14, with further reference to FIGS. 1-12, a method 1400 for validating a mobile device with a second example passive digital key system includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes determining an angle to a mobile device relative to a reference point with at least a first radio transceiver. One of the controllers 910, 1010, 1116, including the processor 410 and the wireless transceiver 440, may be a means for determining an angle. The first radio transceiver may be a short range radio access technology configured for low transmission power to reduced power consumption. In an embodiment, the wireless transceiver may include one or more BLE transmitters, such as the BLE transmitters BLE1 . . . BLE14 in FIG. 10, and configured to obtain signals from the mobile device. For example, the mobile device 1002 may be a user equipment such as a smart phone, a smart watch, fitness band, key fob, or other device configured to send and receive signals with two or more radio access technologies. In an example, the angle to the mobile device 1002 may be based at least in part on the RSSI measurements obtained by one or more of the BLE transceivers BLE1 . . . BLE14. For example, the RSSI measurements 1014 obtained by the tenth BLE transceiver BLE10 may be used to determine that the mobile device 1002 is proximate to the fourth angular segment 1006d. In an example, an estimation algorithm may be a weighted average with higher weightings for the BLE transceivers with stronger RSSI measurements. For example, referring to FIG. 10, BLE10 may have the highest weighting as its RSSI measurement 1014 is the strongest, BLE9 may have the 2nd highest weighting as its RSSI measurement 1016 is the 2nd strongest, and the other BLE transceivers may be weighted accordingly based on a relative comparison of their respective RSSI measurements. The weighted average of the RSSI measurements may be used to determine which of the angular segments the mobile device is located in. In an embodiment, a Wi-Fi transceiver may be configured to determine an AoA of signals transmitted by a mobile device, and the AoA may be used to determine the angle relative to a reference point. In an example, the reference point may be the location of a Wi-Fi antenna module.

At stage 1404, the method includes obtaining a measured distance to the mobile device with at least a second radio transceiver. One of the controllers 910, 1010, 1116, including the processor 410 and the wireless transceiver 440, may be a means for obtaining the measured distance. The second radio transceiver may be a medium range radio access technology and may have higher transmission power than the first radio transceiver. In an embodiment, the wireless transceiver may include one or more Wi-Fi transceivers, such as the Wi-Fi transceiver 1008 in FIG. 10, and configured to obtain range information associated with the mobile device 1002. In an example, the second radio transceiver may be configured to utilize a wider bandwidth than the first radio transceiver. For example, the second radio transceiver may be a UWB radio communicatively coupled to the controller 1010. The second distance may be based on Wi-Fi ranging techniques such as RSSI and RTT. For example, a Wi-Fi range estimate may be based on the signals 1018 received from the mobile device 1002. Other radio access technologies and ranging techniques may also be used.

At stage 1406, the method includes obtaining a calibration distance based at least in part on the angle to the mobile device. One of the controllers 910, 1010, 1116, including the processor 410, may be a means for obtaining the calibration distance. In an embodiment, the controller 1010 may include a perimeter calibration database such as the data structure 1200. The data structure may be queried based on the angle determined at stage 1402. For example, the signals obtained by the BLE transceivers may be used to select one of the angular segments 1006a-p based on the position of the mobile device 1002. The Wi-Fi transceiver 1008 may be associated with several angle based calibration values (e.g., ang1cal, ang2cal, etc.), and a calibration value for one or more of the angular segments 1006a-p may be used as the calibration distance. In an example, more than one angular segment may be selected and interpolation techniques may be used on the corresponding calibration values to obtain the calibration distance. The calibration distance may correspond to the distance value 1012 indicating a distance from the Wi-Fi transceiver 1008 to the perimeter of the vehicle 1004 in an angular segment (e.g., the fourth angular segment 1006d). In an embodiment, the calibration values may be based on distances measured from a reference point, such as the reference point 1020 at the center of the vehicle. Other reference points may also be used.

At stage 1408, the method includes computing a validation distance based at least in part on a difference between the measured distance and the calibration distance. One of the controllers 910, 1010, 1116, including the processor 410, may be a means for computing the validation distance. The measured distance obtained at stage 1404 may be based on the distance between the location of an antenna of the second radio transceiver and the mobile device 1002. The location of the antenna may be physically displaced from the perimeter of the vehicle 1004. The calibration distances may be used as bias values to compensate for the physical displacement of the antenna relative to various points on the perimeter of the vehicle 1004. Other arithmetic and trigonometric functions may be used to compute the validation distance. For example, the locations of the antennas and the mobile device relative to the reference point may be included in the validation distance computations.

At stage 1410, the method includes validating the mobile device based at least in part on a comparison of the validation distance and a threshold value. One of the controllers 910, 1010, 1116, including the processor 410, may be a means for validating the mobile device. In an example, the comparison may include determining if the validation distance is equal to or less than a pre-determined threshold (e.g., 0.5 m, 1 m, 2 m, etc.). In an embodiment, the threshold value may be based on context information associated with the mobile device such a location (e.g., at home, at a mall, in the city), time away (e.g., short time away, larger threshold value), neighboring vehicle density (e.g., smaller threshold distances may be used in dense parking lots), and time of day (e.g., smaller threshold distances in the night). Other mobile device state, environmental, and vehicle state values may be used to determine a context and/or used to set the threshold values. In an example, one or more look-up-tables may be used to associate a threshold value with one or more context parameters. Upon validation of the mobile device, a DKUS executing on the controller 1010 may be configured to unlock the vehicle, enable an ignition system, or perform other security related procedures.

While the example passive digital key system depicted in FIG. 10 utilizes BLE and Wi-Fi radio access technologies, the method 1400 is not so limited as other active and passive radio access technologies may also be used. For example, the first and second radio transceivers may be based on D2D, P2P, 5G NR sidelinks, UWB radios, RFID systems, Wi-Fi, BLE, and other radio access technologies configured for RF ranging applications.

Figure 15:
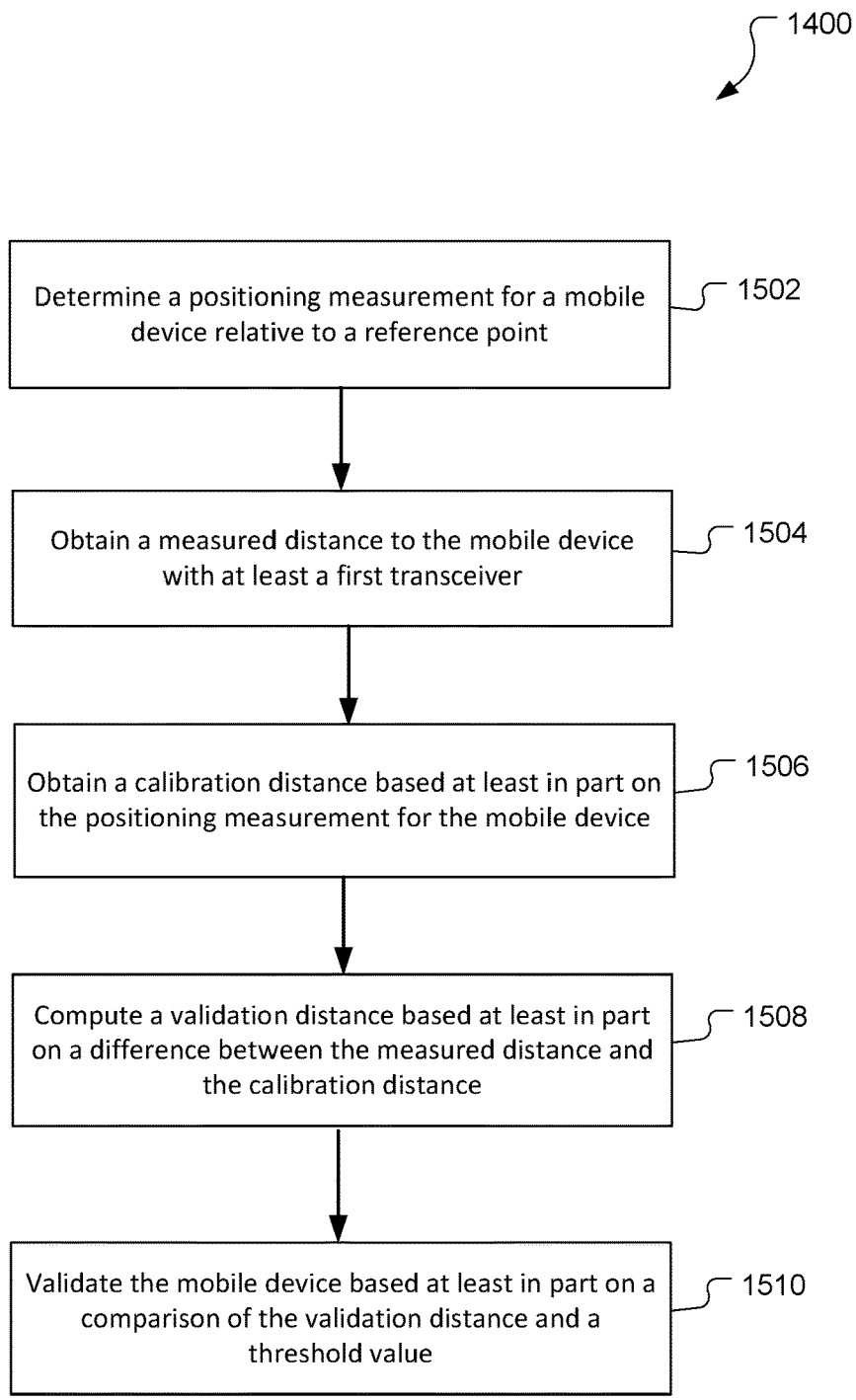
FIG. 15 is a process flow for a method of validating a mobile device with a third example passive digital key system.

Referring to FIG. 15, with further reference to FIGS. 1-12, a method 1500 for validating a mobile device with a third example passive digital key system includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes determining a positioning measurement for a mobile device relative to a reference point. One of the controllers 910, 1010, 1116, including the processor 410 and the wireless transceiver 440, may be a means for determining the positioning measurement. The positioning measurement may be a distance, an angle, or a combination of both. In an embodiment, the wireless transceiver may include one or more low power and/or bandwidth limited transceivers, such a BLE based transceiver, disposed in a known position relative to the reference point. Determining the positioning measurement may include determining an angle to the mobile device by detecting the mobile device with a transceiver, and using the angle of the location of a transceiver relative to the reference point as the angle to the mobile device. In an embodiment, a transceiver may be configured to determine an Angle of Arrival (AoA) of signals transmitted by the mobile device. The AoA may be used to determine the angle relative to a reference point. In an example, the reference point may be the location of a transceiver. In an embodiment, determining the positioning measurement may include determining a distance to the mobile device. For example, the one or more BLE based transceivers may be configured to obtain RSSI measurements from the mobile device to determine the distance. Other radio ranging techniques, such as time of flight measurements, may also be used.

At stage 1504, the method includes obtaining a measured distance to the mobile device with at least a first transceiver. One of the controllers 910, 1010, 1116, including the processor 410 and the wireless transceiver 440, may be a means for obtaining the measured distance. The first transceiver may be configured to obtain range information associated with the mobile device. The measured distance may be based on radio frequency ranging techniques such as RSSI, and time of flight measurements such as used in RTT procedures. In an embodiment, additional radio transceivers may be used and the measured distance may be based on ranging techniques such as multi-RTT, AoAs, TDOA, etc. Other radio access technologies and ranging techniques may also be used.

At stage 1506, the method includes obtaining a calibration distance based at least in part on the positioning measurement to the mobile device. One of the controllers 910, 1010, 1116, including the processor 410, may be a means for obtaining the calibration distance. In an embodiment, a data structure may be queried based on the angle to the mobile device. The data structure may include distance and/or angle calibration values associated with the first radio receiver. For example, when the positioning measurement obtained at stage 1502 is a distance, the calibration distance may be based on an identification value associated with the BLE transceiver reporting the positioning measurement (e.g., ble1cal, ble2cal, etc.). When the positioning measurement obtained at stage 1502 is an angle, the calibration distance may be based on the angle (e.g., ang1cal, ang2cal, etc.). The calibration distance may be obtained based on one or more look-up-tables including distances and/or angles and the associated calibration distances. In an example, interpolation functions may be used to obtain a calibration distance for intervening distance and/or angle values (i.e., angle values between the angle values in the look-up-table)

At stage 1508, the method includes computing a validation distance based at least in part on a difference between the measured distance and the calibration distance. One of the controllers 910, 1010, 1116, including the processor 410 may be a means for computing the validation distance. In an embodiment, the processor 410 may be configured to subtract the calibration distance from the measured distance, and the remainder is the validation distance. Other arithmetic and trigonometric operations may also be used based on the angle, the reference point, the measured distance, the calibration distance and the associated transceiver/antenna locations.

At stage 1510, the method includes validating the mobile device based at least in part on a comparison of the validation distance and a threshold value. One of the controllers 910, 1010, 1116, including the processor 410 may be a means for validating the mobile device. In an example, the comparison may include determining if the validation distance is equal to or less than a pre-determined threshold (e.g., 0.5 m, 1 m, 2 m, etc.). In an embodiment, the threshold value may be based on context information such a location (e.g., at home, at a mall, in the city), time away (e.g., short time away, larger threshold value), neighboring vehicle density (e.g., smaller threshold distances may be used in dense parking lots), and time of day (e.g., smaller threshold distances in the night). Other environmental and vehicle contexts may be used to set the threshold values.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the location server may be performed outside of the location such as by an AP.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method of validating a mobile device, comprising:
    determining a positioning measurement for the mobile device relative to a reference point;
    obtaining a measured distance with at least a first transceiver;
    obtaining a calibration distance based at least in part on the positioning measurement for the mobile device;
    computing a validation distance based at least in part on a difference between the measured distance and the calibration distance; and
    validating the mobile device based at least in part on a comparison of the validation distance and a threshold value.
2. The method of clause 1 wherein the reference point and the first transceiver are within a vehicle.
3. The method of clause 1 wherein the reference point and the first transceiver are within a fixed structure.
4. The method of clause 1 wherein the positioning measurement indicates an angle to the mobile device.
5. The method of clause 4 wherein determining the angle to the mobile device includes determining an angle of arrival of a signal transmitted by the mobile device.
6. The method of clause 5 wherein the signal transmitted by the mobile device is received by the first transceiver.
7. The method of clause 4 wherein determining the angle to the mobile device includes determining the mobile device is proximate to a second transceiver, wherein the second transceiver is disposed in a known location relative to the reference point.
8. The method of clause 7 further comprising determining a received signal strength of one or more signals transmitted by the mobile device and received by the second transceiver.
9. The method of clause 8 wherein the second transceiver is configured to utilize a smaller bandwidth than the first transceiver.
10. The method of clause 4 wherein obtaining the calibration distance includes querying a data structure based on the angle.
11. The method of clause 1 wherein obtaining the measured distance to the mobile device includes determining a time of flight for signals transmitted between the mobile device and the first transceiver.

12. The method of clause 1 wherein the positioning measurement indicates a distance to the mobile device measured by at least one second transceiver.

13. The method of clause 12 wherein the distance to the mobile device is based on at least one of a received signal strength indication measurement, or a time of flight measurement.

14. The method of clause 12 wherein obtaining the calibration distance includes querying a data structure based on an identification value associated with the at least one second transceiver.

15. The method of clause 1 further comprising:
determining a context associated with the mobile device; and
determining the threshold value based on the context.

16. A method of validating a mobile device, comprising:
determining an angle to the mobile device relative to a reference point with at least a first radio transceiver;
obtaining a measured distance to the mobile device with at least a second radio transceiver;
obtaining a calibration distance based at least in part on the angle to the mobile device;
computing a validation distance based at least in part on a difference between the measured distance and the calibration distance; and
validating the mobile device based at least in part on a comparison of the validation distance and a threshold value.

17. The method of clause 16 wherein determining the angle to the mobile device includes determining the mobile device is located within a predefined angular segment.

18. The method of clause 16 wherein the second radio transceiver is configured to utilize a wider bandwidth than the first radio transceiver.

19. The method of clause 16 wherein obtaining the calibration distance includes obtaining the calibration distance from a data structure based at least in part on the angle to the mobile device.

20. The method of clause 16 wherein the first radio transceiver and the second radio transceiver are disposed in a vehicle, and the calibration distance is based on a distance between the second radio transceiver and a perimeter of the vehicle.

21. The method of clause 16 wherein the first radio transceiver and the second radio transceiver are disposed in a vehicle, and the calibration distance is based on a distance between the reference point and a perimeter of the vehicle.

22. The method of clause 16 wherein the first radio transceiver and the second radio transceiver are disposed in a vehicle, and the threshold value is based on a context of the vehicle.

23. The method of clause 16 wherein the first radio transceiver is proximate to an entrance to a fixed structure, and the second radio transceiver is a radio access point within the fixed structure.

24. The method of clause 16 wherein obtaining the measured distance includes determining a round trip time between the second radio transceiver and the mobile device.

25. An apparatus, comprising:
a memory;
at least one transceiver;
at least one processor communicatively coupled to the memory and the at least one transceiver, and configured to:
determine a positioning measurement for a mobile device relative to a reference point;
obtain a measured distance with at least a first transceiver;
obtain a calibration distance based at least in part on the positioning measurement for the mobile device;
compute a validation distance based at least in part on a difference between the measured distance and the calibration distance; and
validate the mobile device based at least in part on a comparison of the validation distance and a threshold value.

26. The apparatus of clause 25 wherein the reference point and the first transceiver are within a vehicle.

27. The apparatus of clause 25 wherein the reference point and the first transceiver are within a fixed structure.

28. The apparatus of clause 25 wherein the positioning measurement indicates an angle to the mobile device.

29. The apparatus of clause 28 wherein the at least one processor is further configured to determine an angle of arrival of a signal transmitted by the mobile device.

30. The apparatus of clause 29 wherein the signal transmitted by the mobile device is received by the first transceiver.

31. The apparatus of clause 29 further comprising a second transceiver disposed in a known location relative to the reference point, wherein the at least one processor is further configured to determine the mobile device is proximate to the second transceiver.

32. The apparatus of clause 31 wherein the at least one processor is further configured to determine a received signal strength of one or more signals transmitted by the mobile device and received by the second transceiver.

33. The apparatus of clause 32 wherein the second transceiver is configured to utilize a smaller bandwidth than the first transceiver.

34. The apparatus of clause 28 wherein the at least one processor is further configured to query a data structure stored in the memory based on the angle.

35. The apparatus of clause 25 wherein the at least one processor is further configured to determine a time of flight for signals transmitted between the mobile device and the first transceiver.

36. The apparatus of clause 25 wherein the positioning measurement indicates a distance to the mobile device measured by at least one second transceiver.

37. The apparatus of clause 36 wherein the at least one processor is further configured to compute the distance to the mobile device based on at least one of a received signal strength indication measurement, or a time of flight measurement.

38. The apparatus of clause 36 wherein the at least one processor is further configured to query a data structure stored in the memory based on an identification value associated with the at least one second transceiver.

39. The apparatus of clause 25 wherein the at least one processor is further configured to:
determine a context associated with the mobile device; and
determine the threshold value based on the context.

40. An apparatus, comprising:
a memory;
at least one transceiver;
at least one processor communicatively coupled to the memory and the at least one transceiver, and configured to:
determine an angle to a mobile device relative to a reference point with at least a first radio transceiver;
obtain a measured distance to the mobile device with at least a second radio transceiver;
obtain a calibration distance based at least in part on the angle to the mobile device;
compute a validation distance based at least in part on a difference between the measured distance and the calibration distance; and
validate the mobile device based at least in part on a comparison of the validation distance and a threshold value.

41. The apparatus of clause 40 wherein the at least one processor is further configured to determine the mobile device is located within a predefined angular segment.

42. The apparatus of clause 40 wherein the second radio transceiver is configured to utilize a wider bandwidth than the first radio transceiver.

43. The apparatus of clause 40 wherein the at least one processor is further configured to obtain the calibration distance from a data structure stored in the memory based at least in part on the angle to the mobile device.

44. The apparatus of clause 40 wherein the first radio transceiver and the second radio transceiver are disposed in a vehicle, and the calibration distance is based on a distance between the second radio transceiver and a perimeter of the vehicle.

45. The apparatus of clause 40 wherein the first radio transceiver and the second radio transceiver are disposed in a vehicle, and the calibration distance is based on a distance between the reference point and a perimeter of the vehicle.

46. The apparatus of clause 40 wherein the first radio transceiver and the second radio transceiver are disposed in a vehicle, and the threshold value is based on a context of the vehicle.

47. The apparatus of clause 40 wherein the first radio transceiver is proximate to an entrance to a fixed structure, and the second radio transceiver is a radio access point within the fixed structure.

48. The apparatus of clause 40 wherein the at least one processor is further configured to determine a round trip time between the second radio transceiver and the mobile device.

49. An apparatus for validating a mobile device, comprising:
means for determining a positioning measurement for the mobile device relative to a reference point;
means for obtaining a measured distance with at least a first transceiver;
means for obtaining a calibration distance based at least in part on the positioning measurement for the mobile device;
means for computing a validation distance based at least in part on a difference between the measured distance and the calibration distance; and
means for validating the mobile device based at least in part on a comparison of the validation distance and a threshold value.

50. An apparatus for validating a mobile device, comprising:
means for determining an angle to the mobile device relative to a reference point with at least a first radio transceiver;
means for obtaining a measured distance to the mobile device with at least a second radio transceiver;
means for obtaining a calibration distance based at least in part on the angle to the mobile device;
means for computing a validation distance based at least in part on a difference between the measured distance and the calibration distance; and
means for validating the mobile device based at least in part on a comparison of the validation distance and a threshold value.

51. A non-transitory processor-readable storage medium comprising processor-readable instructions configured to cause one or more processors to validate a mobile device, comprising:
code for determining a positioning measurement for the mobile device relative to a reference point;
code for obtaining a measured distance with at least a first transceiver;
code for obtaining a calibration distance based at least in part on the positioning measurement for the mobile device;
code for computing a validation distance based at least in part on a difference between the measured distance and the calibration distance; and
code for validating the mobile device based at least in part on a comparison of the validation distance and a threshold value.

52. A non-transitory processor-readable storage medium comprising processor-readable instructions configured to cause one or more processors to validate a mobile device, comprising:
code for determining an angle to the mobile device relative to a reference point with at least a first radio transceiver;
code for obtaining a measured distance to the mobile device with at least a second radio transceiver;
code for obtaining a calibration distance based at least in part on the angle to the mobile device;
code for computing a validation distance based at least in part on a difference between the measured distance and the calibration distance; and
code for validating the mobile device based at least in part on a comparison of the validation distance and a threshold value.

53. A method of validating a mobile device, comprising:
measuring a first distance between the mobile device and a first point with a first transceiver;
measuring a second distance between the mobile device and a second point with a second transceiver;
obtaining a validation distance based at least in part on the first point and the second point; and
validating the mobile device based at least in part on a comparison of the first distance, the second distance, and the validation distance.

54. The method of clause 53 wherein the first point is an antenna operably coupled to the first transceiver and the second point is an antenna operably coupled to the second transceiver.

55. The method of clause 53 wherein the second transceiver has a longer communication range than the first transceiver.

56. The method of clause 53 wherein the second transceiver is configured to utilize a wider bandwidth than the first transceiver.

57. The method of clause 53 wherein obtaining the validation distance includes obtaining the validation distance from a data structure based at least in part on the first point and the second point.
58. The method of clause 53 wherein the validation distance is based on a distance between the second point and a perimeter of a vehicle.
59. The method of clause 53 wherein the validation distance is based on a distance between the first point and the second point.
60. The method of clause 53 wherein the first point is proximate to an entrance to a building, and the second point is a location of a radio access point within the building.
61. The method of clause 53 further comprising:
measuring an angle of arrival of a signal transmitted by the mobile device with the second transceiver; and
obtaining the validation distance based at least in part on the angle of arrival.
62. The method of clause 53 wherein measuring the second distance includes determining a round trip time between the second transceiver and the mobile device.
63. An apparatus, comprising:
a memory;
at least two transceivers;
at least one processor communicatively coupled to the memory and the at least two transceivers, and configured to:
measure a first distance between a mobile device and a first point with a first transceiver;
measure a second distance between the mobile device and a second point with a second transceiver;
obtain a validation distance based at least in part on the first point and the second point; and
validate the mobile device based at least in part on a comparison of the first distance, the second distance, and the validation distance.
64. The apparatus of clause 63 wherein the first point is an antenna operably coupled to the first transceiver and the second point is an antenna operably coupled to the second transceiver.
65. The apparatus of clause 63 wherein the second transceiver has a longer communication range than the first transceiver.
66. The apparatus of clause 63 wherein the second transceiver is configured to utilize a wider bandwidth than the first transceiver.
67. The apparatus of clause 63 wherein the at least one processor is further configured to obtain the validation distance from a data structure based at least in part on the first point and the second point.
68. The apparatus of clause 63 wherein the validation distance is based on a distance between the second point and a perimeter of a vehicle.
69. The apparatus of clause 63 wherein the validation distance is based on a distance between the first point and the second point.
70. The apparatus of clause 63 wherein the first point is proximate to an entrance to a building, and the second point is a location of a radio access point within the building.
71. The apparatus of clause 63 wherein the at least one processor is further configured to:
measure an angle of arrival of a signal transmitted by the mobile device with the second transceiver; and
obtain the validation distance based at least in part on the angle of arrival.
72. The apparatus of clause 63 wherein the at least one processor is further configured to determine a round trip time between the second transceiver and the mobile device.
73. An apparatus for validating a mobile device, comprising:
means for measuring a first distance between the mobile device and a first point with a first transceiver;
means for measuring a second distance between the mobile device and a second point with a second transceiver;
means for obtaining a validation distance based at least in part on the first point and the second point; and
means for validating the mobile device based at least in part on a comparison of the first distance, the second distance, and the validation distance.
74. A non-transitory processor-readable storage medium comprising processor-readable instructions configured to cause one or more processors to validate a mobile device, comprising:
code for measuring a first distance between the mobile device and a first point with a first transceiver;
code for measuring a second distance between the mobile device and a second point with a second transceiver;
code for obtaining a validation distance based at least in part on the first point and the second point; and
code for validating the mobile device based at least in part on a comparison of the first distance, the second distance, and the validation distance.

The invention claimed is:
1. A method of validating a mobile device, comprising:
determining a positioning measurement for the mobile device relative to a reference point;
obtaining a measured distance with at least a first transceiver;
obtaining a calibration distance based at least in part on the positioning measurement for the mobile device;
computing a validation distance based at least in part on a difference between the measured distance and the calibration distance; and
validating the mobile device based at least in part on a comparison of the validation distance and a threshold value.
2. The method of claim 1 wherein the reference point and the first transceiver are within a vehicle.
3. The method of claim 1 wherein the reference point and the first transceiver are within a fixed structure.
4. The method of claim 1 wherein the positioning measurement indicates an angle to the mobile device.
5. The method of claim 4 wherein determining the angle to the mobile device includes determining an angle of arrival of a signal transmitted by the mobile device.
6. The method of claim 5 wherein the signal transmitted by the mobile device is received by the first transceiver.
7. The method of claim 4 wherein determining the angle to the mobile device includes determining the mobile device is proximate to a second transceiver, wherein the second transceiver is disposed in a known location relative to the reference point.
8. The method of claim 7 further comprising determining a received signal strength of one or more signals transmitted by the mobile device and received by the second transceiver.
9. The method of claim 8 wherein the second transceiver is configured to utilize a smaller bandwidth than the first transceiver.

10. The method of claim 4 wherein obtaining the calibration distance includes querying a data structure based on the angle.

11. The method of claim 1 wherein obtaining the measured distance to the mobile device includes determining a time of flight for signals transmitted between the mobile device and the first transceiver.

12. The method of claim 1 wherein the positioning measurement indicates a distance to the mobile device measured by at least one second transceiver.

13. The method of claim 12 wherein the distance to the mobile device is based on at least one of a received signal strength indication measurement, or a time of flight measurement.

14. The method of claim 12 wherein obtaining the calibration distance includes querying a data structure based on an identification value associated with the at least one second transceiver.

15. The method of claim 1 further comprising:
determining a context associated with the mobile device; and
determining the threshold value based on the context.

16. A method of validating a mobile device, comprising:
determining an angle to the mobile device relative to a reference point with at least a first radio transceiver;
obtaining a measured distance to the mobile device with at least a second radio transceiver;
obtaining a calibration distance based at least in part on the angle to the mobile device;
computing a validation distance based at least in part on a difference between the measured distance and the calibration distance; and
validating the mobile device based at least in part on a comparison of the validation distance and a threshold value.

17. The method of claim 16 wherein determining the angle to the mobile device includes determining the mobile device is located within a predefined angular segment.

18. The method of claim 16 wherein the second radio transceiver is configured to utilize a wider bandwidth than the first radio transceiver.

19. The method of claim 16 wherein obtaining the calibration distance includes obtaining the calibration distance from a data structure based at least in part on the angle to the mobile device.

20. The method of claim 16 wherein the first radio transceiver and the second radio transceiver are disposed in a vehicle, and the calibration distance is based on a distance between the second radio transceiver and a perimeter of the vehicle.

21. The method of claim 16 wherein the first radio transceiver and the second radio transceiver are disposed in a vehicle, and the calibration distance is based on a distance between the reference point and a perimeter of the vehicle.

22. The method of claim 16 wherein the first radio transceiver and the second radio transceiver are disposed in a vehicle, and the threshold value is based on a context of the vehicle.

23. The method of claim 16 wherein the first radio transceiver is proximate to an entrance to a fixed structure, and the second radio transceiver is a radio access point within the fixed structure.

24. The method of claim 16 wherein obtaining the measured distance includes determining a round trip time between the second radio transceiver and the mobile device.

25. An apparatus, comprising:
a memory;
at least one transceiver;
at least one processor communicatively coupled to the memory and the at least one transceiver, and configured to:
determine a positioning measurement for a mobile device relative to a reference point;
obtain a measured distance with at least a first transceiver;
obtain a calibration distance based at least in part on the positioning measurement for the mobile device;
compute a validation distance based at least in part on a difference between the measured distance and the calibration distance; and
validate the mobile device based at least in part on a comparison of the validation distance and a threshold value.

26. The apparatus of claim 25 wherein the reference point and the first transceiver are within a vehicle.

27. The apparatus of claim 25 wherein the reference point and the first transceiver are within a fixed structure.

28. The apparatus of claim 25 wherein the positioning measurement indicates an angle to the mobile device.

29. The apparatus of claim 28 wherein the at least one processor is further configured to determine an angle of arrival of a signal transmitted by the mobile device.

30. The apparatus of claim 29 wherein the signal transmitted by the mobile device is received by the first transceiver.

31. The apparatus of claim 29 further comprising a second transceiver disposed in a known location relative to the reference point, wherein the at least one processor is further configured to determine the mobile device is proximate to the second transceiver.

32. The apparatus of claim 31 wherein the at least one processor is further configured to determine a received signal strength of one or more signals transmitted by the mobile device and received by the second transceiver.

33. The apparatus of claim 32 wherein the second transceiver is configured to utilize a smaller bandwidth than the first transceiver.

34. The apparatus of claim 28 wherein the at least one processor is further configured to query a data structure stored in the memory based on the angle.

35. The apparatus of claim 25 wherein the at least one processor is further configured to determine a time of flight for signals transmitted between the mobile device and the first transceiver.

36. The apparatus of claim 25 wherein the positioning measurement indicates a distance to the mobile device measured by at least one second transceiver.

37. The apparatus of claim 36 wherein the at least one processor is further configured to compute the distance to the mobile device based on at least one of a received signal strength indication measurement, or a time of flight measurement.

38. The apparatus of claim 36 wherein the at least one processor is further configured to query a data structure stored in the memory based on an identification value associated with the at least one second transceiver.

39. The apparatus of claim 25 wherein the at least one processor is further configured to:
determine a context associated with the mobile device; and
determine the threshold value based on the context.

40. An apparatus, comprising:
a memory;
at least one transceiver;
at least one processor communicatively coupled to the memory and the at least one transceiver, and configured to:
- determine an angle to a mobile device relative to a reference point with at least a first radio transceiver;
- obtain a measured distance to the mobile device with at least a second radio transceiver;
- obtain a calibration distance based at least in part on the angle to the mobile device;
- compute a validation distance based at least in part on a difference between the measured distance and the calibration distance; and
- validate the mobile device based at least in part on a comparison of the validation distance and a threshold value.

41. The apparatus of claim 40 wherein the at least one processor is further configured to determine the mobile device is located within a predefined angular segment.

42. The apparatus of claim 40 wherein the second radio transceiver is configured to utilize a wider bandwidth than the first radio transceiver.

43. The apparatus of claim 40 wherein the at least one processor is further configured to obtain the calibration distance from a data structure stored in the memory based at least in part on the angle to the mobile device.

44. The apparatus of claim 40 wherein the first radio transceiver and the second radio transceiver are disposed in a vehicle, and the calibration distance is based on a distance between the second radio transceiver and a perimeter of the vehicle.

45. The apparatus of claim 40 wherein the first radio transceiver and the second radio transceiver are disposed in a vehicle, and the calibration distance is based on a distance between the reference point and a perimeter of the vehicle.

46. The apparatus of claim 40 wherein the first radio transceiver and the second radio transceiver are disposed in a vehicle, and the threshold value is based on a context of the vehicle.

47. The apparatus of claim 40 wherein the first radio transceiver is proximate to an entrance to a fixed structure, and the second radio transceiver is a radio access point within the fixed structure.

48. The apparatus of claim 40 wherein the at least one processor is further configured to determine a round trip time between the second radio transceiver and the mobile device.

49. An apparatus for validating a mobile device, comprising:
- means for determining a positioning measurement for the mobile device relative to a reference point;
- means for obtaining a measured distance with at least a first transceiver;
- means for obtaining a calibration distance based at least in part on the positioning measurement for the mobile device;
- means for computing a validation distance based at least in part on a difference between the measured distance and the calibration distance; and
- means for validating the mobile device based at least in part on a comparison of the validation distance and a threshold value.

50. An apparatus for validating a mobile device, comprising:
- means for determining an angle to the mobile device relative to a reference point with at least a first radio transceiver;
- means for obtaining a measured distance to the mobile device with at least a second radio transceiver;
- means for obtaining a calibration distance based at least in part on the angle to the mobile device;
- means for computing a validation distance based at least in part on a difference between the measured distance and the calibration distance; and
- means for validating the mobile device based at least in part on a comparison of the validation distance and a threshold value.

* * * * *